US012746967B1

(12) United States Patent
Cao et al.

(10) Patent No.: US 12,746,967 B1
(45) Date of Patent: Sep. 29, 2026

(54) STEER-BY-WIRE SYSTEM WITH SPRING-TO-CENTER STEERING WHEEL CONTROL OF A VEHICLE BASED ON STEERING WHEEL TORQUE AND/OR VEHICLE YAW RATE

(71) Applicant: Ford Global Technologies, LLC, Dearborn, MI (US)

(72) Inventors: Bang Kim Cao, Northville, MI (US); Matthew Meyerholtz Johnson, Toledo, OH (US); Jonathan Craig Sullivan, Ferndale, MI (US); David Gon Oh, Canton, MI (US); Sage Aaron Stubbs, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/091,744

(22) Filed: Mar. 26, 2025

(51) Int. Cl.
*B62D 5/04* (2006.01)
*B62D 6/00* (2006.01)

(52) U.S. Cl.
CPC ......... *B62D 5/0463* (2013.01); *B62D 5/0466* (2013.01); *B62D 6/005* (2013.01)

(58) Field of Classification Search
CPC ..... B62D 5/0463; B62D 5/0466; B62D 6/005
USPC .................................. 701/41, 42, 43, 44, 48
See application file for complete search history.

(56) References Cited

U.S. PATENT DOCUMENTS

| | | | |
|---|---|---|---|
| 9,669,869 B2 | 6/2017 | Kageyama et al. | |
| 10,029,725 B2 | 7/2018 | Schulz et al. | |
| 10,053,147 B2 | 8/2018 | Matsuo et al. | |
| 10,427,705 B2 | 10/2019 | Cao et al. | |
| 12,084,122 B2 * | 9/2024 | Tsubaki ............... | B62D 5/0409 |
| 2004/0011585 A1 | 1/2004 | Menjak et al. | |
| 2008/0251312 A1 | 10/2008 | Goto et al. | |
| 2017/0151906 A1 | 6/2017 | Sakuma | |
| 2018/0037254 A1 | 2/2018 | Izutani et al. | |
| 2019/0225261 A1 | 7/2019 | Kodera | |
| 2020/0023893 A1 | 1/2020 | Naik et al. | |

FOREIGN PATENT DOCUMENTS

| | | |
|---|---|---|
| EP | 1088739 A2 | 4/2001 |
| WO | 2008120231 A2 | 10/2008 |

OTHER PUBLICATIONS

Innova, "What is Yaw Rate," dated Jan. 8, 2024, 10 pages.
CSS Electronics, "Can Bus Explained—A Simple Intro," dated Dec. 16, 2024, 36 pages.
Kinetrol, "Spring to Center Actuators," dated Dec. 21, 2024, 6 pages.
United States Patent and Trademark Office, "Non-Final Office Action," issued in connection with U.S. Appl. No. 19/091,756, dated Jun. 30, 2026, 7 pages.

* cited by examiner

*Primary Examiner* — Hai H Huynh
(74) *Attorney, Agent, or Firm* — Lorne Forsythe; Hanley, Flight & Zimmerman, LLC

(57) ABSTRACT

Disclosed example include interface circuitry to obtain a steering wheel torque value corresponding to torque produced via a spring-to-center steering wheel; machine-readable instructions; and at least one processor circuit to be programmed by the machine-readable instructions to: determine a steering pinion angle value based on the steering wheel torque value; and control a road wheel actuator to turn a road wheel based on the steering pinion angle value.

16 Claims, 16 Drawing Sheets

STEER COMMAND CONTROLLER

STEER-BY-WIRE SYSTEM WITH SPRING-TO-CENTER STEERING WHEEL CONTROL OF A VEHICLE BASED ON STEERING WHEEL TORQUE AND/OR VEHICLE YAW RATE

FIELD OF THE DISCLOSURE

This disclosure relates generally to steering systems and, more particularly, to steer-by-wire systems with spring-to-center steering wheel control of a vehicle based on steering wheel torque and/or vehicle yaw rate.

BACKGROUND

Vehicles include multiple subsystems to carry out various functions. A steering subsystem enables a vehicle operator to control the direction of movement of the vehicle. In a mechanical steering subsystem, a steering shaft extends from a steering wheel to a rack and pinion assembly or a steering box system between the two front wheels of the vehicle. As the vehicle operator turns or rotates the steering wheel, the rotational motion is transferred through the steering shaft and translated into a linear movement by the rack and pinion assembly or the steering box system. The linear movement controls a steering direction of the two front wheels.

SUMMARY

An example steer-by-wire system includes interface circuitry to obtain a steering wheel torque value corresponding to torque produced via a spring-to-center steering wheel, machine-readable instructions, and at least one processor circuit to be programmed by the machine-readable instructions to determine a steering pinion angle value based on the steering wheel torque value, and control a road wheel actuator to turn a road wheel based on the steering pinion angle value.

An example steer-by-wire system includes interface circuitry to obtain a measured yaw rate value of a vehicle, and obtain a steering wheel torque value corresponding to torque produced via a spring-to-center steering wheel, machine-readable instructions, and at least one processor circuit to be programmed by the machine-readable instructions to determine a target yaw rate value based on the steering wheel torque value, determine a yaw rate difference between the measured yaw rate value and the target yaw rate value, determine a steering pinion angle value based on the yaw rate difference, and control a road wheel actuator to turn a road wheel based on the steering pinion angle value.

At least one example non-transitory machine-readable medium includes machine-readable instructions to cause at least one processor circuit to at least access a steering wheel torque value corresponding to torque produced via a spring-to-center steering wheel, determine a steering pinion angle value based on the steering wheel torque value, and control a road wheel actuator to turn a road wheel based on the steering pinion angle value.

At least one non-transitory machine-readable medium includes machine-readable instructions to cause at least one processor circuit to at least determine a target yaw rate value based on a steering wheel torque value, the steering wheel torque value corresponding to torque applied to a spring-to-center steering wheel, determine a yaw rate difference between a measured yaw rate value of a vehicle and the target yaw rate value, determine a steering pinion angle value based on the yaw rate difference, and control a road wheel actuator to turn a road wheel based on the steering pinion angle value.

An example steer-by-wire system includes interface circuitry to obtain a measured lateral acceleration value of a vehicle, and obtain a steering wheel torque value corresponding to torque produced via a spring-to-center steering wheel, machine-readable instructions, and at least one processor circuit to be programmed by the machine-readable instructions to determine a target lateral acceleration value based on the steering wheel torque value, determine a lateral acceleration difference between the measured lateral acceleration value and the target lateral acceleration value, determine a steering pinion angle value based on the lateral acceleration difference, and control a road wheel actuator to turn a road wheel based on the steering pinion angle value.

An example steer-by-wire system includes interface circuitry to obtain a measured road wheel actuator force value, and obtain a steering wheel torque value corresponding to torque produced via a spring-to-center steering wheel, machine-readable instructions, and at least one processor circuit to be programmed by the machine-readable instructions to determine a target road wheel actuator force value based on the steering wheel torque value, determine a road wheel actuator force difference between the measured road wheel actuator force value and the target road wheel actuator force value, determine a steering pinion angle value based on the road wheel actuator force difference, and control a road wheel actuator to turn a road wheel based on the steering pinion angle value.

At least one example non-transitory machine-readable medium comprising machine-readable instructions to cause at least one processor circuit to at least determine a target lateral acceleration value based on a steering wheel torque value, the steering wheel torque value corresponding to torque applied to a spring-to-center steering wheel, determine a lateral acceleration difference between a measured lateral acceleration value of a vehicle and the target lateral acceleration value, determine a steering pinion angle value based on the lateral acceleration difference, and control a road wheel actuator to turn a road wheel based on the steering pinion angle value.

At least one example non-transitory machine-readable medium includes machine-readable instructions to cause at least one processor circuit to at least determine a target road wheel actuator force value based on a steering wheel torque value, the steering wheel torque value corresponding to torque applied to a spring-to-center steering wheel, determine a road wheel actuator force difference between a measured road wheel actuator force value and the target road wheel actuator force value, determine a steering pinion angle value based on the road wheel actuator force difference, and control a road wheel actuator to turn a road wheel based on the steering pinion angle value.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
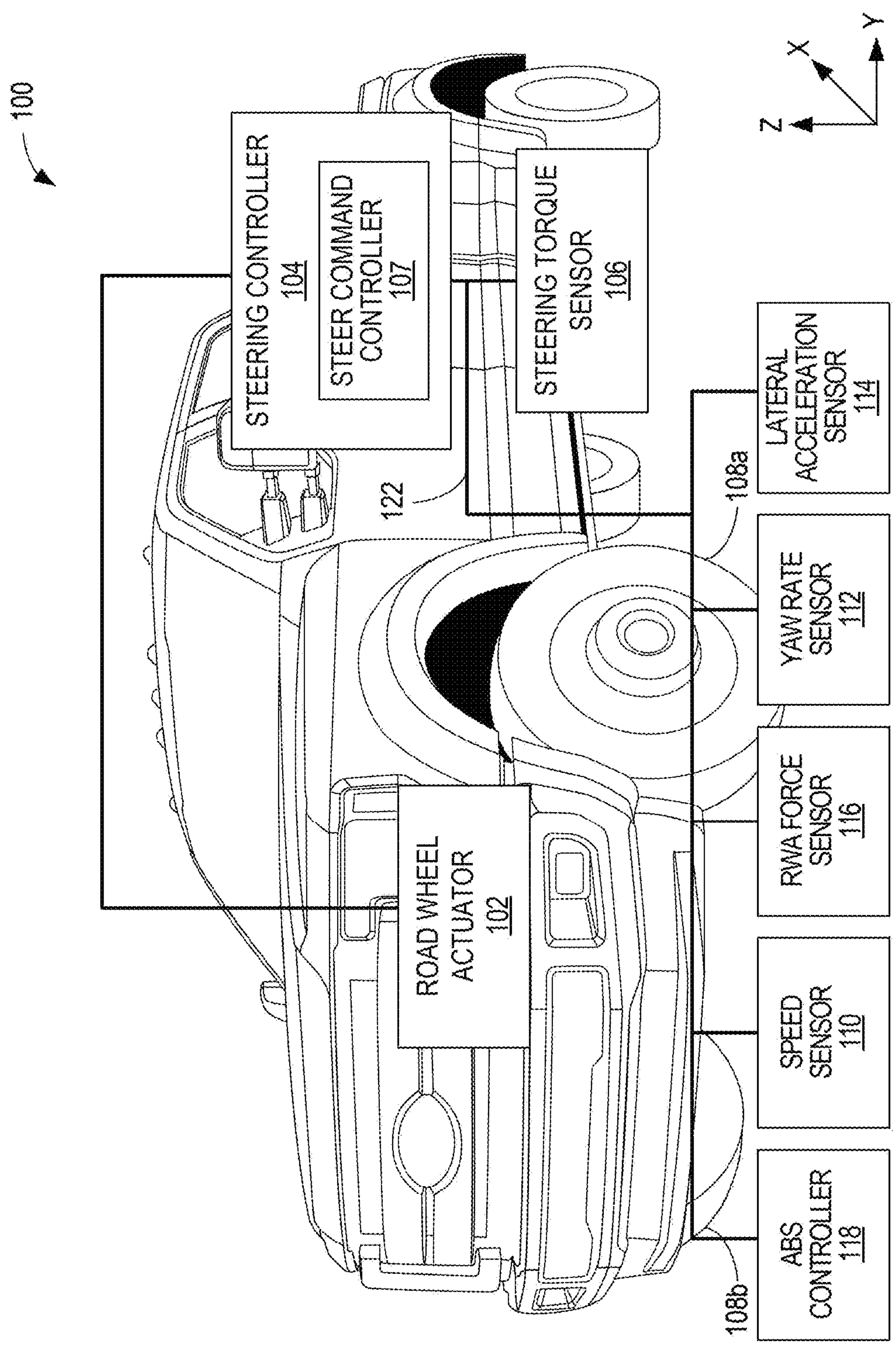
FIG. 1 is a perspective view of a vehicle in which an example steer command controller is implemented as part of a steer-by-wire (SBW) system.

Steer-by-wire systems provide vehicle operating benefits such as variable gear ratios between a steering wheel rotation and a road wheel angle, new cabin designs and experiences, and quiet wheel capabilities for Level 2/Level 3 (L2+/L3) driving modes of a vehicle's advanced driver-assistance system (ADAS). Quiet wheel is implemented by parking a steering wheel to prevent its rotation while a vehicle's ADAS assists a driver in steering the vehicle.

Examples disclosed herein include a spring-to-center steering wheel (e.g., a small-angle steering wheel) to determine a driver's intent related to vehicle steering and to provide feedback to the driver as the driver applies steering wheel torque input via the spring-to-center steering wheel. In examples disclosed herein, a vehicle's steering is controlled based on amounts of torque applied by a driver to a spring-to-center steering wheel. For example, the amount of torque applied by a driver's hands to the spring-to-center steering wheel is measured and processed to control the road wheel angles of the vehicle for steering operations. As used herein, a spring-to-center steering wheel is defined as a steering wheel (e.g., a handwheel of a vehicle) that resists rotation and is center-biased throughout a steering operation regardless of whether a vehicle is in motion or stationary and/or regardless of whether the SBW system is powered or not powered. The rotation-resistant characteristic causes the spring-to-center steering wheel to turn less than or equal to approximately 20~30 degrees in either left (e.g., counter-clockwise) or right (e.g., clockwise) directions during vehicle steering while providing sufficient steering information to control turn angles of the road wheels of the vehicle through their full road wheel angle range. Alternatively, in other examples, the spring-to-center steering wheel may be implemented to turn more than approximately 20~30 degrees in counterclockwise or clockwise directions during vehicle steering.

In examples disclosed herein, a center position of a steering wheel is a rotational position in which the steering wheel is at a zero-degree angle of orientation relative to a rest or reset orientation. As such, the center-bias characteristic of a spring-to-center steering wheel causes the spring-to-center steering wheel to generate a constant counter-torque back towards a center position or zero-angle position in response to driver-applied torque on the spring-to-center steering wheel away from center. When a driver releases the spring-to-center steering wheel, the spring-to-center steering wheel springs, recoils, rebounds, or otherwise returns back to the center position, regardless of whether the vehicle is in motion or stationary. In some examples, this return-to-center motion can be dampened to create a smooth motion.

In examples disclosed herein, the rotation-resistant and center-bias characteristics create the spring-recoil or spring-rebound responses when a spring-to-center steering wheel is urged in the left or right directions by a driver. Such spring-recoil or spring-rebound responses provide steering feedback to the driver by resisting the driver's steering wheel torque input. This built-in steering feedback allows substantially eliminating or reducing motor-generated steering wheel feedback used in some SBW systems. Accordingly, electrical power consumption can be substantially reduced during steering operations while still providing steering feedback to the driver through the spring-recoil, or spring-rebound, characteristic of the spring-to-center steering wheel. In addition, the rotation-resistant and center-bias characteristics allow measuring driver input steering wheel torque to control steering of a vehicle. Example spring-to-center steering wheels disclosed herein also reduced complexity of a handwheel actuator and reduce hardware non-operational modes of a handwheel actuator due to reduced complexity. Example spring-to-center steering wheels disclosed herein also facilitate synchronizing an ADAS steering angle when transitioning from ADAS steering control to non-assisted steering control and the vehicle is in a turn maneuver.

In examples disclosed herein, a spring-to-center steering wheel is coupled to a rotationally-resistant structure (e.g., a steering shaft, one or more springs, etc.) of a vehicle. For example, the spring-to-center steering wheel may be coupled to a steering shaft in which the steering shaft is secured to prevent or resist its rotation. In such examples, any rotation of the steering shaft in the clockwise or counterclockwise directions is due to its torsional flexibility. However, the steering shaft continuously urges itself back to its center position, regardless of whether the vehicle is in motion or stationary. Accordingly, steering shafts of examples disclosed herein are spring-to-center steering shafts.

In some examples, to secure a spring-to-center steering wheel to prevent its rotation, a portion of a spring-to-center steering shaft (e.g., a shaft end opposite the steering wheel) is fixed to a structure in a non-rotatable state. This makes the spring-to-center steering wheel resistant to rotation based on a torsional rigidity of the spring-to-center steering shaft. In other examples, a portion of the spring-to-center steering shaft is coupled to springs that resist rotation of the steering shaft. In other examples, the steering shaft is omitted and the spring-to-center steering wheel is coupled to one or more springs (e.g., air spring(s), Belville washer spring(s), leaf spring(s), cam spring(s), and/or any other spring type) that resist rotation of the spring-to-center steering wheel. In any case, the rotation of the spring-to-center steering wheel is limited to small angles (e.g., small angular rotation approximately less than or equal to 20~30-degree angles in counterclockwise or clockwise directions), as allowed by the torsional flex of the spring-to-center steering shaft (or as allowed by a tension of a spring coupled to the spring-to-center steering shaft or coupled to the spring-to-center steering wheel). As such, the spring-to-center steering wheel resists rotation regardless of the amount of rotational torque applied by a driver through the steering wheel to steer the vehicle, regardless of the speed of the vehicle or whether the vehicle is in motion, and/or regardless of whether the SBW system is powered or not powered. In other examples, the torsional flex of the spring-to-center steering shaft may be selected to allow the spring-to-center steering wheel to be turned from center to greater than approximately 20~30 degrees in counterclockwise or clockwise directions. In examples disclosed herein, the fixed, rotation-resistant state of the spring-to-center steering wheel remains as such throughout operation or non-operation of the vehicle. Accordingly, in examples disclosed herein, steering control is based on the amount of clockwise or counterclockwise torque applied by the driver on the steering wheel even if rotational angle displacement of the steering wheel is limited.

The rotation-resistant and center-bias characteristics of spring-to-center steering wheels disclosed herein are unlike prior, fully rotatable steering wheels. That is, unlike spring-to-center steering wheels disclosed herein that resist rotation as described above, a prior, fully rotatable steering wheel can rotate up to and beyond 360 degrees during steering events of a vehicle in response to rotational torque applied to the steering wheel by a driver. Example spring-to-center steering wheels disclosed herein are useful to transition between a vehicle's manual steering mode (e.g., a steering mode in which steering of a vehicle is completely based on human steering input) and the vehicle's driver-assistance mode (e.g., a steering mode in which the vehicle's ADAS assists with steering the vehicle through machine-generated commands). For example, with prior, fully rotatable steering wheels, when the vehicle is in manual steering mode, the rotatable steering wheel is free to rotate so that the driver's steering input applied to the steering wheel turns the steering wheel to control the vehicle's direction of travel. However, under some scenarios when the vehicle transitions to the driver-assistance mode, the rotatable steering wheel may be parked so that the steering wheel does not physically rotate while the vehicle's ADAS assists with control of the steering.

In prior, fully rotatable steering wheel systems, transitioning from the driver-assistance mode to the manual steering mode is a complex process due to needing to synchronize a rotational position of the steering wheel to an angle of the road wheels before full control is handed over to the driver. For example, in a driver-assistance mode, a vehicle's ADAS may be assisting with turning the road wheels to a particular road wheel angle having a corresponding steering wheel angle. However, if the steering wheel is parked at center (e.g., a zero-degree steering wheel angle) and the vehicle's road wheels are turned, the steering wheel angle does not match the road wheel angle. As such, in the scenario where the driver abruptly disables the ADAS (e.g., abruptly assumes full control over steering activities) and the rotatable steering wheel angle is not aligned with the road wheel angle, handing over full control to the driver for manual steering is subject to first aligning the steering wheel angle with the road wheel angle.

Implementing SBW systems using example spring-to-center steering wheels disclosed herein eliminates the process of synchronizing between steering wheel rotation position and road wheel angle because a spring-to-center steering wheel remains substantially near center regardless of whether a vehicle is in manual steering mode or driver-assistance mode. As such, a steering wheel angle does not need to be matched to a road wheel angle when transitioning between a driver-assistance mode and a manual steering mode. Implementing SBW systems using example spring-to-center steering wheels disclosed herein also allows implementing buttons, switches, screens, etc. on the steering wheel because a spring-to-center steering wheel can be implemented with fewer components in the steering wheel than used in prior, fully rotatable steering wheels. In addition, example spring-to-center steering wheels disclosed herein do not require clockspring/rotary contact for electrical connections and enable steering wheel-mounted displays to maintain a generally stable orientation for driver viewing.

Examples disclosed herein use torque measurements associated with a spring-to-center steering wheel in a SBW system to determine a driver's steering intent. For example, examples disclosed herein control road wheel angles based on driver torque input via a spring-to-center steering wheel without needing to rely on angular positions of a steering wheel as in prior, fully rotatable steering wheel systems. That is, examples disclosed herein determine driver intent for steering control based on driver torque input without needing to rely on visual steering wheel positions used by prior, fully rotatable steering wheel systems to indicate when road wheel are turning.

In examples disclosed herein, a torsional stiffness of the rotationally-resistant structure coupled to the spring-to-center steering wheel can be tuned during vehicle development. A lookup table and/or mathematical function can be used to translate a measured steering wheel torque (e.g., input by a driver via the spring-to-center steering wheel) to a corresponding road wheel angle or road wheel steering system position based on the tuned or calibrated torsional stiffness of the spring structure. As used herein, a road wheel steering system is a system coupled to the road wheels of a vehicle and that applies forces to the road wheels to change the road wheel angles of the road wheels according to different steering angles (e.g., steering pinion angles). Example road wheel steering systems include rack and pinion systems, recirculating ball/pitman arm steering systems, steering boxes, etc. Examples described herein in connection with a rack and pinion system may alternatively be implemented using any other suitable type of steering system. In implementations that determine road wheel steering system positions based on examples disclosed herein, such road wheel steering system positions may be for a front-wheel steering system in vehicles having only front-wheel steering systems. Alternatively, such road wheel steering system positions may be for a front-wheel steering system and/or a rear-wheel steering system in vehicles having front-wheel steering and/or rear-wheel steering systems.

Examples disclosed herein provide multiple steering control modes for a SBW system based on a spring-to-center steering wheel. Example steering control modes include an example steering-torque-based steer command mode, an example yaw-rate-based steer command mode, an example lateral-acceleration-based steer command mode, and an example road wheel actuator (RWA) force-based steer command mode. In the example steering-torque-based steer command mode, steering wheel torque (e.g., input by a driver via the spring-to-center steering wheel) is measured and used to directly determine a corresponding road wheel angle (e.g., a steering pinion angle) or road wheel steering system position to turn the road wheels of a vehicle to create a turn in direction of the vehicle intended by the driver. In the example yaw-rate-based steer command mode, a yaw rate of a vehicle is measured and used in combination with a measured steering wheel torque to determine a corresponding road wheel angle or road wheel steering system position to turn the road wheels of a vehicle to create a turn in direction of the vehicle intended by the driver. In the example lateral-acceleration-based steer command mode, a lateral acceleration of a vehicle is measured and used in combination with a measured steering wheel torque to determine a corresponding road wheel angle or road wheel steering system position to turn the road wheels of a vehicle to create a turn in direction of the vehicle intended by the driver. In the example RWA force-based steer command mode, a force on a road wheel actuator and/or road wheel steering system controlling the road wheel angle is measured. The force on the road wheel actuator and/or the road wheel steering system is used in combination with a measured steering wheel torque to determine a corresponding road wheel angle or road wheel steering system position to turn the road wheels of a vehicle to create a turn in direction of the vehicle intended by the driver. In examples disclosed herein, a measured parameter value (e.g., a measured steering wheel torque, a measured yaw rate, a measured lateral acceleration, or a measured RWA force) may be obtained from a sensor signal generated by a sensor that measures that particular parameter. Alternatively, the measured parameter value may be an estimated parameter value that is calculated based on the sensor signal or based on multiple signals from multiple sensors of a vehicle.

In some examples, a single one of the steering control modes disclosed herein is implemented in a vehicle. In other examples, multiple ones (or all) of the steering control modes disclosed herein are implemented in a vehicle and are individually selectable for use with specific corresponding situations. For example, a controller can select which steering control mode to use based on vehicle conditions, driving conditions, driver inputs, etc. In some of the steering control modes, more driver input steering wheel torque or lower vehicle speeds result in steering road wheels according to larger road wheel angles. In some examples, multiples ones of the steering control modes disclosed herein can be used in combination to control steering of a vehicle. For example, a controller may blend multiple ones of the steering control modes to maneuver a vehicle's directions of travel as the vehicle conditions, driving conditions, driver inputs, etc. change. For example, while driving straight on a road with a lot of road crown, it may be useful to select the yaw-rate-based steer command mode where no (or very little) input steering wheel torque signals a driver's desire that the vehicle travel along a straight path (e.g., zero yaw rate). In examples disclosed herein, rate limiting (e.g., how quickly a road wheel angle can be changed), low-pass filtering, and/or saturation limits (e.g., maximum physical limits of a road wheel angle) are applied to generate steering command outputs. Such limiting and/or low-pass filtering can be applied individually on a per-steering control mode basis or in combination based on a steering command output of multiples ones of the steering control modes.

FIG. 1 is a perspective view of an example vehicle 100 in which examples disclosed herein can be implemented. In the illustrated example of FIG. 1, the vehicle 100 includes an example road wheel actuator 102, an example steering controller 104, and an example steering torque sensor 106. Also in the illustrated example, the steering controller 104 includes an example steer command controller 107. The vehicle 100 is a wheel-driven vehicle. In the illustrated example of FIG. 1, the vehicle 100 is a pick-up truck. In other examples, the vehicle 100 can be any type of wheeled vehicle (e.g., a sedan, a coupe, a van, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 is a fully electric vehicle.

Figure 2:
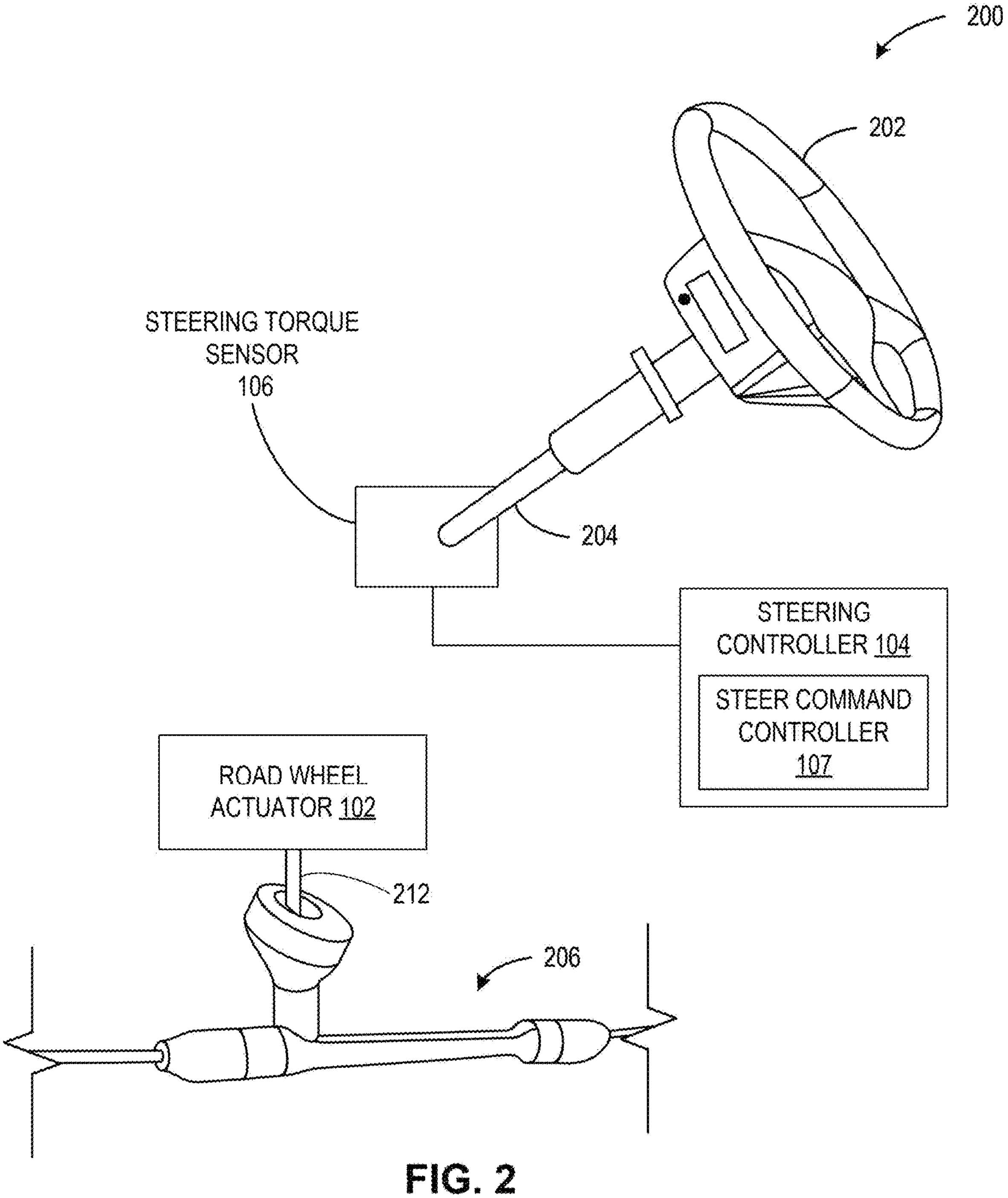
FIG. 2 is a system diagram of an example implementation of a SBW system including the steer command controller of FIG. 1.

In the example of FIG. 1, the road wheel actuator 102 and the steering controller 104 implement a SBW system (e.g., the SBW system 200 of FIG. 2). One or both of the road wheel actuator 102 and the steering controller 104 may be implemented as programmable circuitry. The road wheel actuator 102 allows a user of the vehicle 100 to control/steer front road wheels 108*a,b* of the vehicle 100. In other examples, the road wheel actuator 102 (and/or a separate road wheel actuator) allows a user of a vehicle 100 to also control/steer rear wheels of a four-wheel steer vehicle 100. In the illustrated example of FIG. 1, the road wheel actuator 102 and the steering controller 104 include corresponding communication interfaces (e.g., wired or wireless interfaces) to communicate control information and feedback between the road wheel actuator 102 and the steering controller 104.

The steering controller 104 controls and/or manages the road wheel actuator 102. For example, the steering controller 104 can calculate a rotational angle of the road wheel actuator 102 based on driver input applied to a steering wheel (e.g., the spring-to-center steering wheel 202 of FIG. 2). In some examples, some or all of the steering controller 104 can be implemented by an electronic control unit (ECU) of the vehicle 100. In other examples, the steering controller 104 can be implemented by another suitable computer (e.g., another computer of the vehicle 100, a mobile device of a user of the vehicle 100, a remote computer, etc.).

The steering controller 104 is in circuit with the steering torque sensor 106. For example, the steering torque sensor 106 is provided to measure an amount of input steering wheel torque applied by a driver to a spring-to-center steering wheel (e.g., the spring-to-center steering wheel 202 of FIG. 2) of the vehicle 100. The steering torque sensor 106 provides the measured input steering wheel torque value to the steering controller 104. The steer command controller 107 is provided to use the input steering wheel torque value to generate steering commands that instruct the road wheel actuator 102 how to steer the road wheels 108*a,b* so that the vehicle 100 travels along a path intended by the driver. Although the steer command controller 107 is shown as implemented in the steering controller 104, the steer command controller 107 can alternatively be implemented in the road wheel actuator 102. In such examples, the steer command controller 107 can receive steering wheel torque values from the steering controller 104 based on measured torque values from the steering torque sensor 106.

In the example of FIG. 1, the vehicle 100 is also provided with an example speed sensor 110, an example yaw rate sensor 112, an example lateral acceleration sensor 114, an example RWA force sensor 116, and an example anti-lock braking system (ABS) controller 118. In the example of FIG. 1, the steering torque sensor 106, the speed sensor 110, the yaw rate sensor 112, the lateral acceleration sensor 114, the RWA force sensor 116, and the ABS controller 118 are communicatively coupled with the steering controller 104 and/or the steer command controller 107 via a controller area network (CAN) bus 122. In other examples, the CAN bus 122 may alternatively be implemented using any other suitable type of wired and/or wireless communication system (e.g., a Local Interconnect Network (LIN) bus interface, a Media Oriented Systems Transport (MOST) bus interface, an Automotive Ethernet bus interface, etc.). In examples in which the steer command controller 107 is implemented in the road wheel actuator 102, the steer command controller 107 can receive measurement data associated with the steering torque sensor 106, the speed sensor 110, the yaw rate sensor 112, the lateral acceleration sensor 114, the RWA force sensor 116, and the ABS controller 118 from the steering controller 104. Alternatively, the steering torque sensor 106, the speed sensor 110, the yaw rate sensor 112, the lateral acceleration sensor 114, the RWA force sensor 116, and the ABS controller 118 are communicatively coupled with the road wheel actuator 102 and/or the steer command controller 107 in the road wheel actuator 102 via the CAN bus 122. In some examples, the steering torque sensor 106, the speed sensor 110, the yaw rate sensor 112, the lateral acceleration sensor 114, the RWA force sensor 116, and/or the ABS controller 118 convert sensor signals into measured values to directly generate corresponding measured parameter values. In other examples, the steering torque sensor 106, the speed sensor 110, the yaw rate sensor 112, the lateral acceleration sensor 114, the RWA force sensor 116, and/or the ABS controller 118 calculate estimated parameter values based on sensor data to generate corresponding measured parameter values. In some examples, the vehicle 100 is provided with an inertial measurement unit (e.g., a restraints control module) that directly measures yaw rate, lateral acceleration, vertical acceleration, longitudinal acceleration, roll and/or pitch rates, etc. In such examples, yaw rate measurement values and lateral acceleration measurement values are provided by the inertial measurement unit rather than by separate discrete implementations of the yaw rate sensor 112 and the lateral acceleration sensor 114. In some examples, the speed values, the yaw rate measurement values, the lateral acceleration measurement values, and/or the RWA force measurement values are estimated values that are calculated based on one or more sensor signals from one or more different types of sensors.

The speed sensor 110 is provided to measure a road wheel speed of the vehicle 100. The yaw rate sensor 112 is provided to measure a yaw rate of the vehicle 100 in motion. As used herein, yaw rate refers to the angular velocity of the vehicle 100 around a vertical axis of the vehicle 100. For example, as the vehicle 100 makes a turn, a front end (and/or rear end) of the vehicle 100 pivots horizontally about a vertical axis of the vehicle 100 to move along its path of travel. The rate at which the vehicle 100 pivots horizontally about the vertical axis can be measured as yaw rate by the yaw rate sensor 112. In some examples, cross-winds, road crown, or cross-slope of a road can cause movement in yaw of the vehicle 100.

The lateral acceleration sensor 114 is provided to measure a lateral acceleration (Ay) of the vehicle 100 in motion. As used herein, lateral acceleration refers to the acceleration of side-to-side movement of the vehicle 100. For example, cross-winds, road crown, or cross-slope of a road can exert lateral forces on the vehicle 100 that cause the vehicle 100 to move laterally in side-to-side directions. The lateral acceleration of this lateral movement can be measured by the lateral acceleration sensor 114.

The ABS controller 118 is provided to assist with wheel braking and to measure speed and acceleration/deceleration of the road wheels of the vehicle 100. In some examples, the speed sensor 110, the yaw rate sensor 112, and/or the lateral acceleration sensor 114 can be omitted and speed, yaw rate, and/or lateral acceleration values can be obtained based on measurement values (e.g., speed and/or acceleration measures) from the ABS controller 118. Alternatively, the measurement values from the ABS controller 118 can be used in combination with the speed sensor 110, the yaw rate sensor 112, and/or the lateral acceleration sensor 114 to determine road wheel speed values, yaw rate measurement values, and/or lateral acceleration measurement values.

The RWA force sensor 116 is provided to measure an amount of RWA force exerted on the road wheel actuator 102. The RWA force represents the amount of force exerted on a road wheel steering system (e.g., the rack and pinion system 206 of FIG. 2) of the vehicle 100. Forces (e.g., road wheel steering system forces) can be exerted on the road wheel steering system in response to yaw-based movement and/or lateral movement of the vehicle 100 creating counteracting forces on the road wheels 108*a,b* and/or in response to turning of the road wheels 108*a,b*. As such, the motor of the road wheel actuator 102 generates torque to turn the road wheels 108*a,b* and/or to maintain the road wheels 108*a,b* at a particular road wheel angle. The forces exerted on the road wheel steering system are transferred to the road wheel actuator 102 and can be directly measured by the RWA force sensor 116. Alternatively, the RWA force sensor 116 can estimate an RWA force based on measuring a motor torque that is generated by a motor of the road wheel actuator 102 to counteract the forces from the road wheel steering system. In some examples, the RWA force sensor 116 measures the motor torque based on measuring the amount of electrical current drawn by the motor of the road wheel actuator 102. In some examples, the RWA force sensor 116 and/or the steer command controller 107 (e.g., the arithmetic logic circuitry 508 of FIG. 5) estimates the RWA force using the electrical current drawn by the motor of the road wheel actuator 102 and a state (e.g., acceleration)

of the road wheel system (e.g., the rack and pinion system 206). In such examples, the RWA force measurement value can be estimated based on the equation, $F_{rack}-F_{motor}=m_{rack}\times a_{rack}$, where $F_{rack}$ is the RWA force measurement value (e.g., an estimated actuator force), $F_{motor}$ is an actuator force measured using electrical current draw, $m_{rack}$ is the mass of the rack (e.g., the rack and pinion system 206), and $a_{rack}$ is the acceleration of the rack (e.g., calculated based on a rack position sensor signal). In the case where the road wheel steering system acceleration (e.g., steering rack acceleration) is low, the above equation simplifies to $F_{rack}=F_{motor}$. The actuator force ($F_{motor}$) is proportional to motor torque (Torque_motor), the motor torque (Torque_motor) is proportional to an amount of electrical current drawn by the motor of the road wheel actuator 102 (Current_motor), and the acceleration of the rack ($a_{rack}$) is equal to the change in rack position over time (e.g., $a_{rack}$=DRack_position/dT) or proportional to the change in position of the motor of the road wheel actuator 102 over time (e.g., proportional to DMotor_position/dT). Thus, the estimated actuator force ($F_{rack}$) is proportional to $m_{rack}$*DMotor_position/dT+Current_motor. In some examples, the subscript "rack" of the estimated actuator force ($F_{rack}$) includes all the motor-driven components of a steering system such as the wheels/tires and steering knuckle, and the subscript "rack" of the estimated actuator force ($F_{rack}$) is a generalized term to account for the masses and inertias of those motor-driven components that may resist translation and rotation of the steering system.

FIG. 2 is a system diagram of an example SBW system 200 that includes the road wheel actuator 102, the steering controller 104, the steering torque sensor 106, and the steer command controller 107 of FIG. 1. The SBW system 200 also includes an example spring-to-center steering wheel 202, an example spring-to-center steering shaft 204, and an example rack and pinion system 206. The rack and pinion system 206 is coupled to the front road wheels 108*a,b* of the vehicle 100 (FIG. 1). In other examples, the rack and pinion system 206 (or a rack and pinion system similar to the rack and pinion system 206) is coupled to the rear wheels of a four-wheel steer vehicle 100. In the example of FIG. 2, the steering controller 104, the steering torque sensor 106, and the steer command controller 107 implement a handwheel actuator (HWA) subsystem of the SBW system 200.

The spring-to-center steering wheel 202 is coupled to the spring-to-center steering shaft 204 and allows a user of the vehicle 100 to operate the road wheel actuator 102 and thereby steer the vehicle 100. To do so, the steering controller 104 is in communication with the road wheel actuator 102. For example, the steering controller 104 includes a transceiver (e.g., a wireless or wired transceiver) that is in communication with a transceiver (e.g., a wireless or wired transceiver) of the road wheel actuator 102. As such, the steering controller 104 can use driver inputs (e.g., driver-input steering wheel torque) applied to the spring-to-center steering wheel 202 to generate and transmit steering control signals (e.g., steering commands) to the road wheel actuator 102. In addition, the steering controller 104 can receive vehicle handling feedback from the road wheel actuator 102. The spring-to-center steering wheel 202 includes an interface (e.g., handgrips, etc.) that enables a user to apply torque to the spring-to-center steering shaft 204 that is measured as driver input by the steering torque sensor 106. For example, as the user turns the spring-to-center steering wheel 202, the rotational torque of the spring-to-center steering wheel 202 is transferred through the spring-to-center steering shaft 204 to the steering torque sensor 106.

The rack and pinion system 206 is a linear actuator that includes a pinion engaged with a rack. The road wheel actuator 102 is coupled to the rack and pinion system 206 via an example wheel-steering shaft 212 to receive rotational inputs from the road wheel actuator 102 via the wheel-steering shaft 212. The rack and pinion system 206 translates the rotational inputs from the road wheel actuator 102 into linear motion to steer the road wheels 108*a,b*. In this manner, a user operating the spring-to-center steering wheel 202 causes the rack and pinion system 206 to change directions of the vehicle 100 by steering the road wheels 108*a,b*. Alternatively, instead of the rack and pinion system 206, the vehicle 100 may be provided with a steering box system, a recirculating ball/pitman arm steering system, or any other suitable type of road wheel steering system (e.g., any type of road wheel steering system that translates between rotational motion and linear motion), and examples disclosed herein may be adapted to operate with such steering system.

Figure 3:
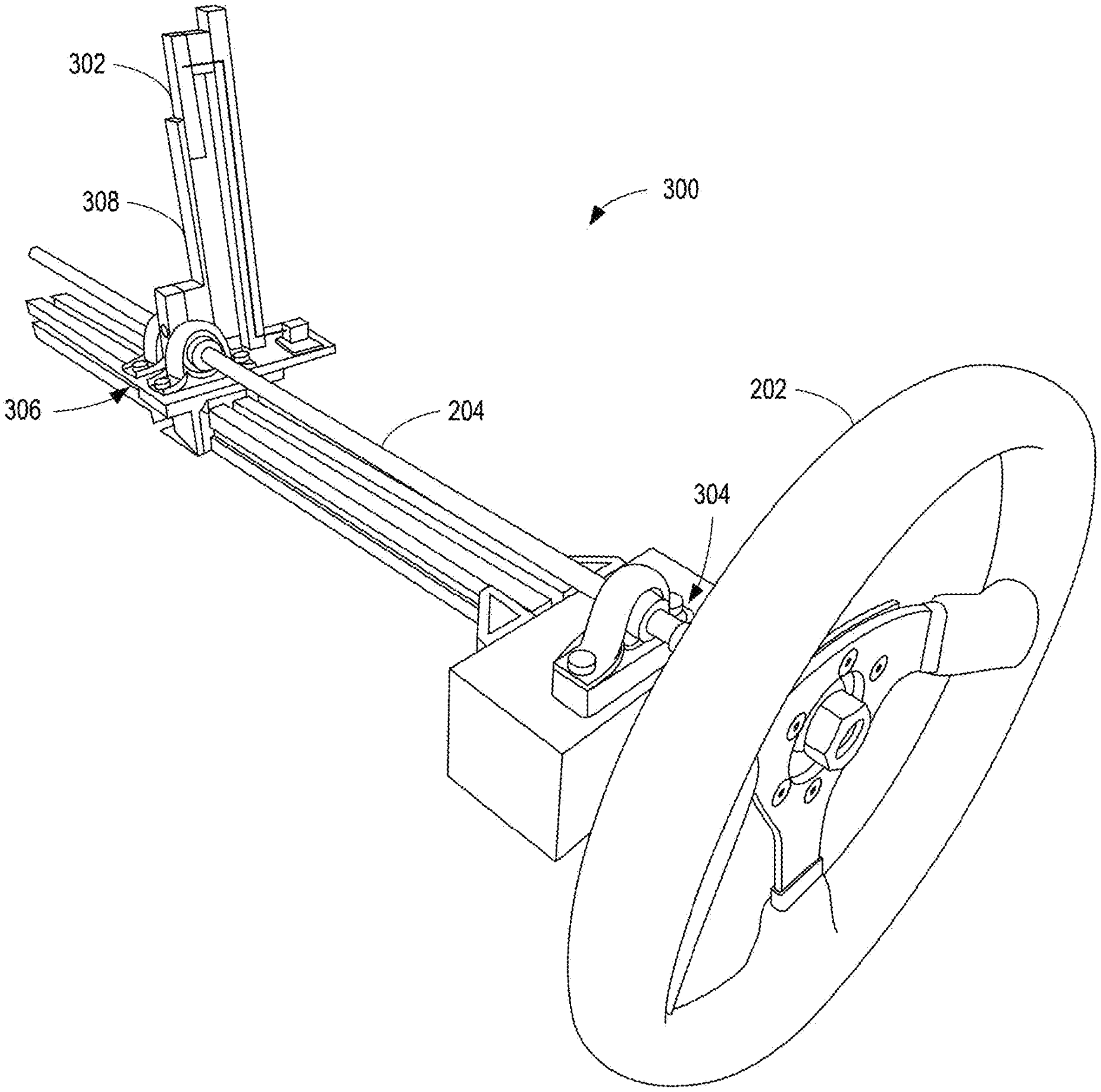
FIG. 3 is an example spring-to-center steering wheel assembly including an example steering shaft and an example torque sensor to measure torque applied to the spring-to-center steering wheel.

FIG. 3 is an example spring-to-center steering wheel assembly 300 including the example spring-to-center steering shaft 204 and an example torque sensor 302 to measure torque applied to the spring-to-center steering wheel 202. The torque sensor 302 may implement the steering torque sensor 106 of FIGS. 1 and 2. In the example of FIG. 3, the spring-to-center steering wheel 202 is coupled to an example steering wheel shaft end 304 of the spring-to-center steering shaft 204 in the vehicle 100. The spring-to-center steering shaft 204 has a fixed shaft portion 306 that is statically fixed to an example torque arm 308. In the example of FIG. 3, the torque arm 308 transfers torque from the spring-to-center steering shaft 204 to the torque sensor 302. The torque arm 308 is rigid in that it is resistant to bending and resists rotation of the fixed shaft portion 306 of the spring-to-center steering shaft 204. The spring-to-center steering wheel 202 is rotationally restricted by a torsional rigidity of the spring-to-center steering shaft 204. That is, while the torque arm 308 resists rotation of the fixed shaft portion 306, the torsional rigidity of the spring-to-center steering shaft 204 resists twisting of the spring-to-center steering shaft 204 between the fixed shaft portion 306 and the steering wheel shaft end 304 when driver input steering wheel torque is applied to the spring-to-center steering wheel 202.

In the example of FIG. 3, the torque sensor 302 is a cantilever load cell and the torque arm 308 spans between the fixed shaft portion 306 and the torque sensor 302. When implemented using a cantilever load cell, the torque sensor 302 detects the amount of clockwise or counterclockwise torque exerted on the spring-to-center steering shaft 204 by a rotational force on the spring-to-center steering wheel 202. For example, in response to the rotational force on the spring-to-center steering wheel 202, the fixed shaft portion 306 exerts a rotational force through the torque arm 308 to the torque sensor 302. Accordingly, the torque arm 308 deflects the torque sensor 302 and the torque sensor 302 senses the torque from the spring-to-center steering wheel 202 based on the force transferred through the torque arm 308 to the torque sensor 302. The torque sensor 302 generates a torque measurement signal representative of the detected clockwise or counterclockwise torque. The torque sensor 302 provides the torque measurement signal to the steering controller 104 for use by the steer command controller 107 to generate a corresponding steering command.

Figure 4B:
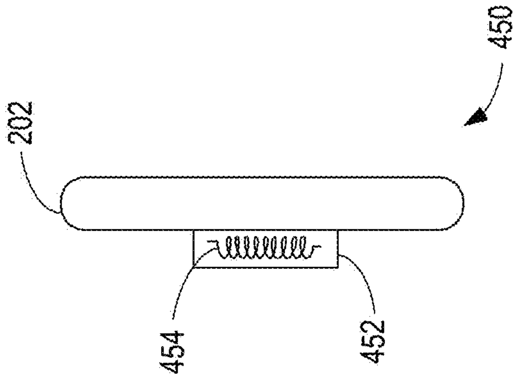
FIG. 4B is an example shaftless spring-to-center steering wheel assembly to measure torque applied to the spring-to-center steering wheel.
Figure 4A:
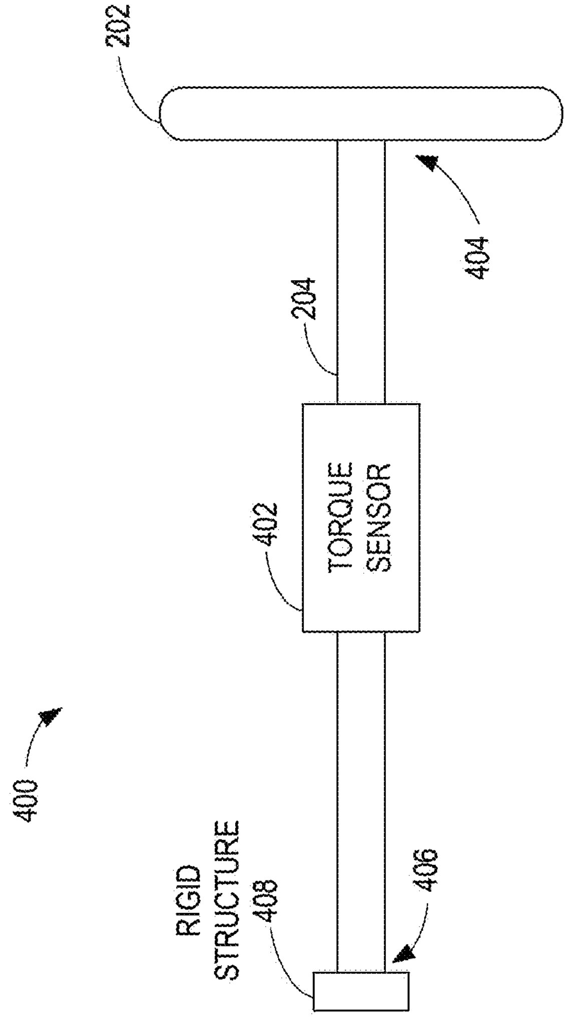
FIG. 4A is another example spring-to-center steering wheel assembly to measure torque applied to the spring-to-center steering wheel.

FIG. 4A is another example spring-to-center steering wheel assembly 400 to measure clockwise and counterclockwise torques applied to the spring-to-center steering wheel 202. In the example of FIG. 4A, the spring-to-center steering wheel assembly 400 includes an example torque sensor 402 to measure torque applied to the spring-to-center steering wheel 202. The torque sensor 402 may implement the steering torque sensor 106 of FIGS. 1 and 2. The spring-to-center steering wheel 202 is coupled to an example steering wheel shaft end 404 of the spring-to-center steering shaft 204 and the spring-to-center steering shaft 204 has an example fixed shaft portion 406 that is statically fixed to an example rigid structure 408. The rigid structure 408 prevents rotation of the fixed shaft portion 406 of the spring-to-center steering shaft 204 so that a torsional flexibility of the spring-to-center steering shaft 204 allows a twisting of the spring-to-center steering shaft 204 commensurate with the amount of torsional force applied by a driver on the spring-to-center steering wheel 202. The rigid structure 408 may be any fixed structure of the vehicle 100 that prevents rotation of the fixed shaft portion 406.

In the example of FIG. 4A, the torque sensor 402 is positioned on the spring-to-center steering shaft 204 between the steering wheel shaft end 404 and the fixed shaft portion 406. Torsional elasticity of the spring-to-center steering shaft 204 causes the spring-to-center steering shaft 204 to twist between the steering wheel shaft end 404 and the fixed shaft portion 406 in response to torsional force applied on the spring-to-center steering wheel 202 while simultaneously transferring torque from the spring-to-center steering wheel 202 to the torque sensor 402. As torque is transferred from the spring-to-center steering wheel 202 to the spring-to-center steering shaft 204, the torque sensor 402 generates a torque measurement signal representative of the detected clockwise or counterclockwise torque and provides the torque measurement signal to the steering controller 104. The steer command controller 107 uses the torque measurement to generate a corresponding steering command.

In some examples, the torque sensor 402 is implemented using a shaft torque sensor such as a rotary torque sensor. In such examples, the shaft torque sensor senses the torque transferred from the spring-to-center steering wheel 202 to the spring-to-center steering shaft 204 and generates a torque measurement signal representative of the detected clockwise or counterclockwise torque. In other examples, the torque sensor 402 is implemented using a strain gauge fixed to a surface of the spring-to-center steering shaft 204.

In yet other examples, the torque sensor 402 is implemented using an encoder (e.g., a rotary encoder, an optical encoder, etc.) in combination with logic circuitry that converts a measured rotational travel (e.g., a twist angle) provided by the encoder to a rotational torque measurement. In yet other examples, the torque sensor 402 is implemented using a geared angle sensor in combination with logic circuitry that converts a measured rotational angle displacement value provided by the geared angle sensor to a rotational torque measurement value. In such examples, the measured rotational travel provided by the encoder or the measured rotational angle displacement provided by the geared angle sensor are a twist angle of the spring-to-center steering shaft 204. The twist angle is representative of an amount of torsional twist between the steering wheel shaft end 404 and the fixed shaft portion 406 based on steering wheel torque produced via the spring-to-center steering wheel 202. The twist angle can be converted to a torque measure based on, for example, a value of torsional rigidity (e.g., a known stiffness) of the spring-to-center steering shaft 204.

FIG. 4B is an example shaftless spring-to-center steering wheel assembly 450 to measure torque applied to the spring-to-center steering wheel 202. The shaftless spring-to-center steering wheel assembly 450 includes an example torque sensor 452. The torque sensor 452 may implement the steering torque sensor 106 of FIGS. 1 and 2. The spring-to-center steering wheel 202 is mounted to the torque sensor 452 so that the torque sensor 452 can measure an amount of steering wheel torque exerted on the spring-to-center steering wheel 202. In the example of FIG. 4B, the torque sensor 452 includes or is co-located with one or more example springs 454. The example springs 454 are coupled to the spring-to-center steering wheel 202 to resist rotational movement of the spring-to-center steering wheel 202 and to center-bias the spring-to-center steering wheel 202. As such, examples disclosed herein may be implemented without a steering shaft (e.g., the spring-to-center steering shaft 204) while still providing substantially similar characteristics to operation of the spring-to-center steering wheel 202 as provided by the spring-to-center steering shaft 204. The example spring-to-center steering wheel assemblies of FIGS. 3, 4A, and 4B are provided as mere examples. Any other suitable configurations for implementing the spring-to-center steering wheel 202 may be used.

Figure 5:
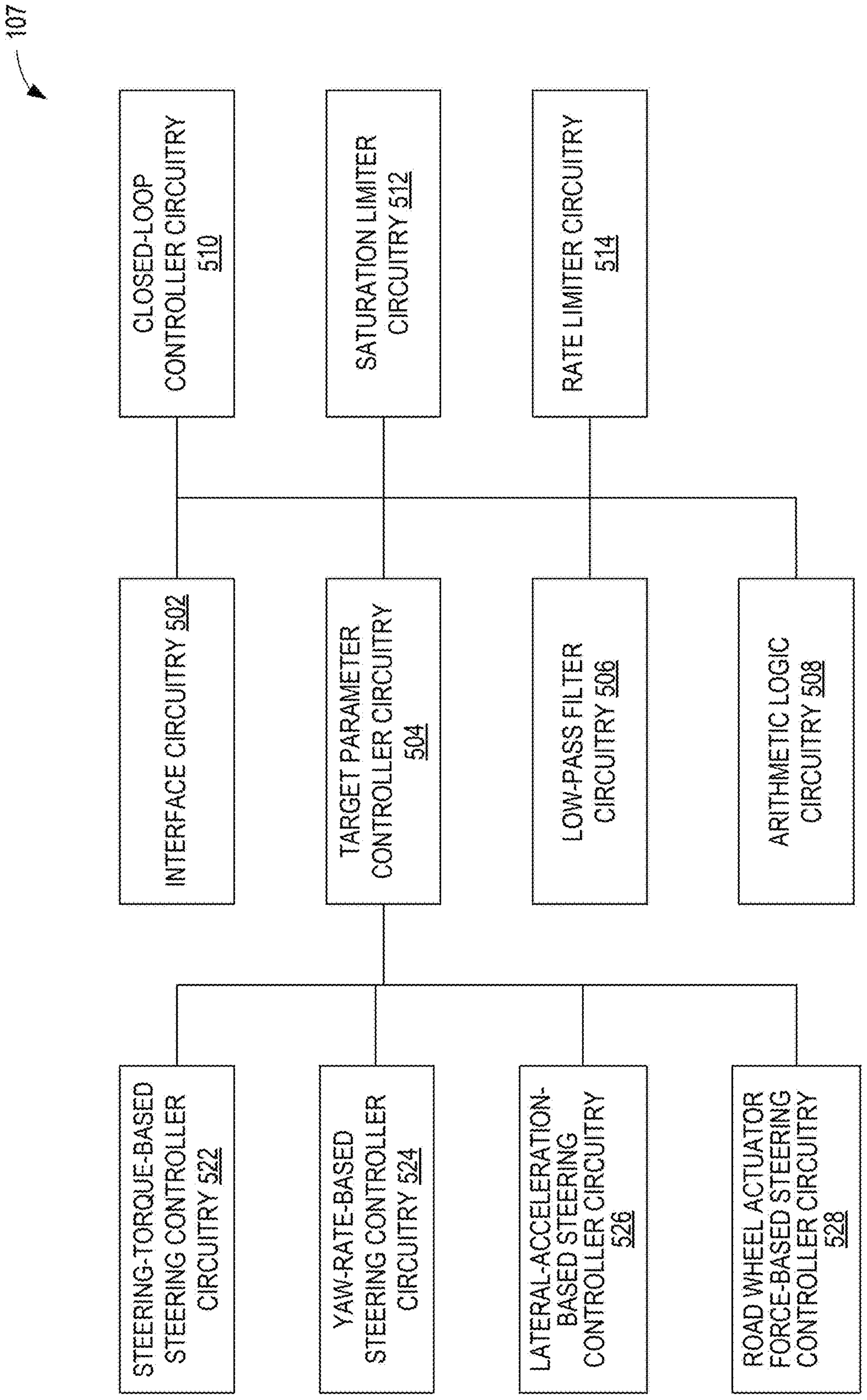
FIG. 5 is a block diagram of an example implementation of the steer command controller of FIGS. 1 and 2.

FIG. 5 is a block diagram of an example implementation of the steer command controller 107 of FIGS. 1 and 2 to generate steer commands based on the spring-to-center steering wheel 202 of FIGS. 2, 3, 4A, and 4B. The steer command controller 107 of FIG. 5 may be instantiated (e.g., creating an instance of, bring into being for any length of time, materialize, implement, etc.) by programmable circuitry such as a Central Processor Unit (CPU) executing first instructions. Additionally or alternatively, the steer command controller 107 of FIG. 5 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 5 may, thus, be instantiated at the same or different times. Some or all of the circuitry of FIG. 5 may be instantiated, for example, in one or more threads executing concurrently on hardware and/or in series on hardware. Moreover, in some examples, some or all of the circuitry of FIG. 5 may be implemented by microprocessor circuitry executing instructions and/or FPGA circuitry performing operations to implement one or more virtual machines and/or containers.

In the example of FIG. 5, the steer command controller 107 includes example interface circuitry 502, example target parameter controller circuitry 504, example low-pass filter circuitry 506, example arithmetic logic circuitry 508, example closed-loop controller circuitry 510, example saturation limiter circuitry 512, and example rate limiter circuitry 514. In the example of FIG. 5, the target parameter controller circuitry 504 includes a plurality of sub controllers to generate steer commands based on different criteria. For example, the target parameter controller circuitry 504 includes example steering-torque-based steering controller circuitry 522, example yaw-rate-based steering controller circuitry 524, example lateral-acceleration-based steering controller circuitry 526, and example road wheel actuator force-based steering controller circuitry 528.

The interface circuitry 502 is provided to access sensor measurement signals and/or sensor measurement values from one or more sensors in the vehicle 100. For example, the interface circuitry 502 may access torque measurement values generated based on torque measurement signals from the steering torque sensor 106. The interface circuitry 502 may also access road wheel speed values from the speed sensor 110. Additionally, the interface circuitry 502 may access yaw rate values corresponding to a yaw of the vehicle 100, lateral acceleration values corresponding to a lateral acceleration of the vehicle 100, and/or RWA values corresponding to forces on the rack and pinion system 206 of the vehicle 100. In some examples, yaw rate measurement values can be accessed based on yaw rate measurements made using the yaw rate sensor 112 of FIG. 1. In some examples, lateral acceleration measurement values can be accessed based on lateral acceleration measurements made using the lateral acceleration sensor 114 of FIG. 1. In some examples, RWA values can be accessed based on RWA force measurements made using the RWA force sensor 116 of FIG. 1. In some examples, the interface circuitry 502 receives sensor signals from the yaw rate sensor 112, the lateral acceleration sensor 114, and/or the RWA force sensor 116 and generates corresponding measurement values based on those sensor signals.

In some examples, the interface circuitry 502 is communicatively coupled to the ABS controller 118 and receives road wheel speed and/or road wheel acceleration/deceleration measurement values from the ABS controller 118. In such examples, the interface circuitry 502 can determine yaw rate measurement values (e.g., actual/current yaw rate values of the vehicle 100) and/or lateral acceleration measurement values (e.g., actual/current lateral acceleration values of the vehicle 100) based on the road wheel speed and/or road wheel acceleration/deceleration signals. In some examples, the interface circuitry 502 can determine yaw rate measurement values and/or lateral acceleration measurement values based on information from a combination of the speed sensors 110, the yaw rate sensor 112, the lateral acceleration sensor 114, and/or the ABS controller 118. In some examples, the interface circuitry 502 may be communicatively coupled to an inertial measurement unit (e.g., a restraints control module) that directly measures yaw rate, lateral acceleration, vertical acceleration, longitudinal acceleration, roll and/or pitch rates, etc. In such examples, the interface circuitry 502 receives yaw rate measurement values, lateral acceleration measurement values, and/or any other available types of measurement values from the inertial measurement unit.

The target parameter controller circuitry 504 is provided to generate steer commands based on one or more target parameters. In examples disclosed herein, target parameters include driver input steering wheel torque, vehicle yaw rate, vehicle lateral acceleration (Ay), and RWA force. The target parameter controller circuitry 504 manages which one or more of the target parameters to select for use in steering the vehicle 100 based on different driving conditions. In some examples, the target parameter controller circuitry 504 may select multiple target parameters so that multiple target parameters may be used concurrently to control steering of the vehicle 100.

In the example of FIG. 5, the target parameter controller circuitry 504 selects different ones of the sub-controllers 522, 524, 526, 528 to generate steering commands based on different target parameters. For example, to generate steering commands based on the steering-torque-based steer command mode, the target parameter controller circuitry 504 selects the steering-torque-based steering controller circuitry 522. To generate steering commands based on the yaw-rate-based steer command mode, the target parameter controller circuitry 504 selects the yaw-rate-based steering controller circuitry 524. To generate steering commands based on the lateral-acceleration-based steer command mode, the target parameter controller circuitry 504 selects the lateral-acceleration-based steering controller circuitry 526. To generate steering commands based on the RWA force-based steer command mode, the target parameter controller circuitry 504 selects the road wheel actuator force-based steering controller circuitry 528. In some examples, the target parameter controller circuitry 504 selects multiples ones of the sub-controllers 522, 524, 526, 528 to generate steering commands based on a blending of steering control using the different target parameters.

In examples disclosed herein, the target parameter controller circuitry 504, the steering-torque-based steering controller circuitry 522, the yaw-rate-based steering controller circuitry 524, the lateral-acceleration-based steering controller circuitry 526, and/or the road wheel actuator force-based steering controller circuitry 528 employ ones of the low-pass filter circuitry 506, the arithmetic logic circuitry 508, the closed-loop controller circuitry 510, the saturation limiter circuitry 512, and the rate limiter circuitry 514 to process input measurement data (e.g., driver input steering wheel torque, road wheel speed, yaw rate, road wheel actuator force, etc.) and generate corresponding steer commands.

The low-pass filter circuitry 506 is provided to remove high-frequency noise in measurement data obtained from one or more of the steering torque sensor 106, the speed sensor 110, the yaw rate sensor 112, the lateral acceleration sensor 114, the RWA force sensor 116, or the ABS controller 118. The low-pass filter circuitry 506 may be configured to perform discrete signal filtering and/or continuous signal filtering. In some examples, one or more of the steering torque sensor 106, the speed sensor 110, the yaw rate sensor 112, the lateral acceleration sensor 114, the RWA force sensor 116, and/or the ABS controller 118 is/are provided with noise filters (e.g., low-pass filters) to perform such high-frequency noise removal form collected measurements. In such examples, filtered measurement values are provided by ones of the steering torque sensor 106, the speed sensor 110, the yaw rate sensor 112, the lateral acceleration sensor 114, the RWA force sensor 116, and/or the ABS controller 118 to the steering controller 104 and/or to the steer command controller 107. In yet other examples, signal filters at the steering torque sensor 106, the speed sensor 110, the yaw rate sensor 112, the lateral acceleration sensor 114, the RWA force sensor 116, and/or the ABS controller 118 can perform first-stage signal filtering and the low-pass filter circuitry 506 can perform second-stage signal filtering.

The arithmetic logic circuitry 508 is provided to perform mathematical and/or logic processes. The closed-loop controller circuitry 510 is provided to analyze measured value inputs and target value inputs and to generate output values that are used to close deviation gaps, or differences, between the measured value inputs and the target value inputs in a closed loop feedback system. For example, a closed-loop feedback system to control steering of the vehicle 100 may determine a target parameter value (e.g., yaw rate, lateral acceleration, RWA force, etc.) as corresponding to driver input steering wheel torque. When the target parameter value is different from a measured parameter value (e.g., an actual/current parameter value) of the vehicle 100, the closed-loop controller circuitry 510 generates an output value used to generate a steer command that steers the vehicle 100 in a manner that moves the measured parameter value closer to the target parameter value. Over time, as the closed-loop controller circuitry 510 analyzes subsequent measured parameter values as feedback in a closed-loop control process, the closed-loop controller circuitry 510 continues generating output values to steer the vehicle 100 towards convergence of the measured parameter value and the target parameter value. The closed-loop controller circuitry 510 may be implemented as a proportional-integral-derivative (PID) controller, a H-infinity controller, a linear-quadratic-regulator (LQR) controller, a model predictive control (MPC) controller, and/or any other suitable type of controller. In some examples, the closed-loop controller circuitry 510 may implement one or more of a PID control algorithm, a H-infinity control algorithm, a LQR control algorithm, a MPC control algorithm, and/or any other suitable type of control algorithm.

The saturation limiter circuitry 512 is provided to limit steer commands to physical road wheel angle limits of the road wheel actuator 102. For example, if driver input steering wheel torque corresponds to a larger road wheel angle (e.g., a steering pinion angle) than the road wheel actuator 102 is capable of creating, the saturation limiter circuitry 512 limits a steer command to the maximum road wheel angle capability (e.g., a maximum steering pinion angle capability) of the road wheel actuator 102. In some examples, the saturation limit(s) used by the saturation limiter circuitry 512 may not be constant value(s), and may be based on any other controller or state machine. For example, a stability control system may detect understeer above some threshold and, in response, limit further road wheel steering angle.

The rate limiter circuitry 514 is provided to limit steer commands to reflect steering wheel rotation rates that are physically possible with a fully rotatable steering wheel. For example, a driver input steering wheel torque applied to the spring-to-center steering wheel 202 of FIGS. 2-5 is translated to a road wheel angle. However, to prevent an abrupt road wheel angle change, the rate limiter circuitry 514 applies a slew rate limit when applying the calculated road wheel angle at the road wheel actuator 102. As such, the rate limiter circuitry 514 controls how quickly the road wheel actuator 102 adjusts the road wheel angle of the road wheels 108*a,b*. To do so, the rate limiter circuitry 514 can decrease how quickly a road wheel angle represented in a steer command is achieved by implementing the road wheel angle value in the steer command based on applying a series of multiple incremental road wheel angle values until the road wheel angle value in the steer command is achieved. In some examples, the slew rate limit(s) used by the rate limiter circuitry 514 may not be constant value(s), and may be based on any other controller or state machine. For example, a driver may select a sport mode in the vehicle 100 to allow faster steering responses from the RWA 102 than a comfort mode. In another example, a driver, a stability control system, and/or an ADAS of the vehicle 100 may select to lower a maximum road wheel slew rate when a slippery road surface is detected.

In some examples, the interface circuitry 502, the target parameter controller circuitry 504, the low-pass filter circuitry 506, the arithmetic logic circuitry 508, the closed-loop controller circuitry 510, the saturation limiter circuitry 512, the rate limiter circuitry 514, the steering-torque-based steering controller circuitry 522, the yaw-rate-based steering controller circuitry 524, the lateral-acceleration-based steering controller circuitry 526, and the road wheel actuator force-based steering controller circuitry 528 are instantiated by programmable circuitry executing instructions and/or configured to perform operations such as those represented by one or more of the control diagrams of FIGS. 6-9 and/or one or more of the flowchart(s) of FIGS. 10-13.

As described above, the interface circuitry 502, the target parameter controller circuitry 504, the low-pass filter circuitry 506, the arithmetic logic circuitry 508, the closed-loop controller circuitry 510, the saturation limiter circuitry 512, the rate limiter circuitry 514, the steering-torque-based steering controller circuitry 522, the yaw-rate-based steering controller circuitry 524, the lateral-acceleration-based steering controller circuitry 526, and the road wheel actuator force-based steering controller circuitry 528 of FIG. 5 are structures. Such structures may implement means for performing corresponding disclosed functions. Examples of such functions are described above in connection with corresponding ones of the interface circuitry 502, the target parameter controller circuitry 504, the low-pass filter circuitry 506, the arithmetic logic circuitry 508, the closed-loop controller circuitry 510, the saturation limiter circuitry 512, the rate limiter circuitry 514, the steering-torque-based steering controller circuitry 522, the yaw-rate-based steering controller circuitry 524, the lateral-acceleration-based steering controller circuitry 526, and the road wheel actuator force-based steering controller circuitry 528 and are described below in connection with the control diagrams of FIGS. 6-9 and the flowcharts of FIGS. 10-13.

While an example manner of implementing the steer command controller 107 of FIG. 1 is illustrated in FIG. 5, one or more of the elements, processes, and/or devices illustrated in FIG. 5 may be combined, divided, re-arranged, omitted, eliminated, and/or implemented in any other way. Further, the interface circuitry 502, the target parameter controller circuitry 504, the low-pass filter circuitry 506, the arithmetic logic circuitry 508, the closed-loop controller circuitry 510, the saturation limiter circuitry 512, the rate limiter circuitry 514, the steering-torque-based steering controller circuitry 522, the yaw-rate-based steering controller circuitry 524, the lateral-acceleration-based steering controller circuitry 526, and the road wheel actuator force-based steering controller circuitry 528, and/or, more generally, the example steer command controller 107 of FIG. 5, may be implemented by hardware alone or by hardware in combination with software and/or firmware. Thus, for example, any of the interface circuitry 502, the target parameter controller circuitry 504, the low-pass filter circuitry 506, the arithmetic logic circuitry 508, the closed-loop controller circuitry 510, the saturation limiter circuitry 512, the rate limiter circuitry 514, the steering-torque-based steering controller circuitry 522, the yaw-rate-based steering controller circuitry 524, the lateral-acceleration-based steering controller circuitry 526, and the road wheel actuator force-based steering controller circuitry 528, and/or, more generally, the example steer command controller 107, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example steer command controller 107 of FIG. 5 may include one or more elements, processes, and/or devices in addition to, or instead of, those illustrated in FIG. 5, and/or may include more than one of any or all of the illustrated elements, processes and devices.

Figure 6:
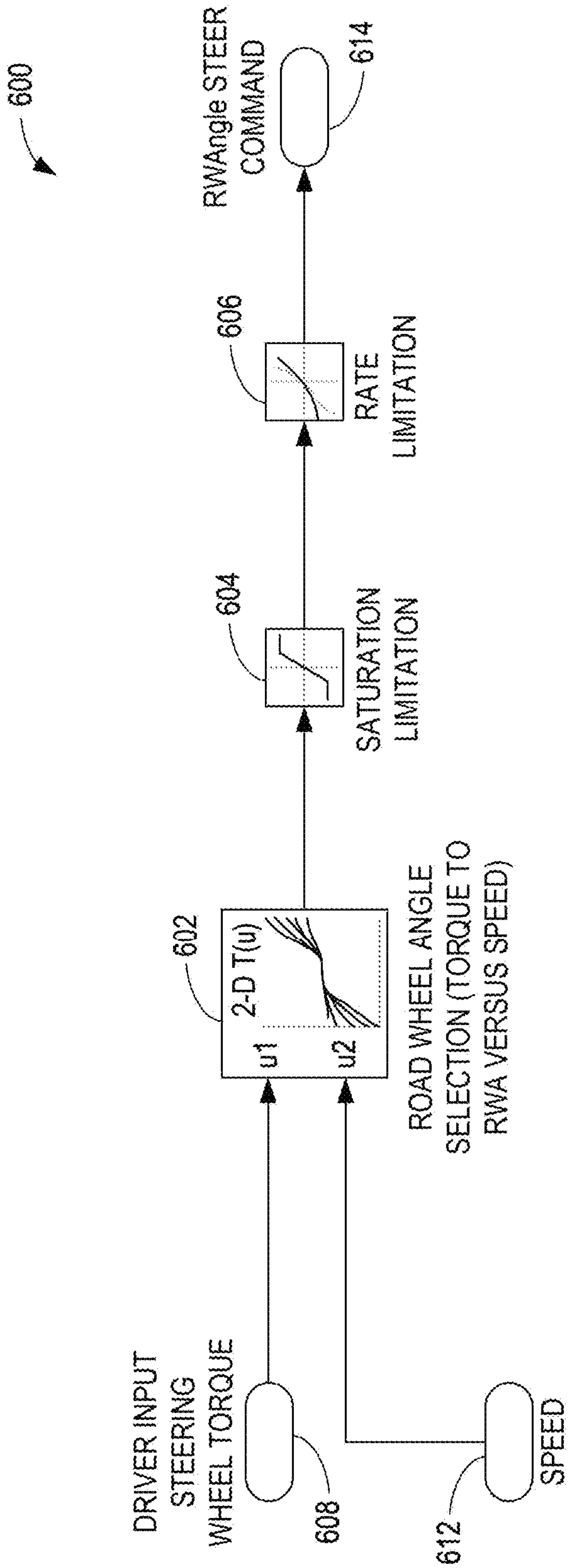
FIG. 6 is an example torque-based steering control diagram that may be used to implement the steer command controller of FIG. 5 to generate steer commands based on driver input steering wheel torque.

FIG. 6 is an example steering-torque-based steering control diagram 600 that may be used to implement the steer command controller 107 of FIG. 5 to generate steer commands based on driver input steering wheel torque using a torque-based steering control model. The steering-torque-based steering control diagram 600 includes an example road wheel angle (RWAngle) selection process 602, an example saturation limitation process 604, and an example rate limitation process 606. In the example of FIG. 6, a driver input steering wheel torque value 608 and a road wheel speed value 612 (e.g., a vehicle speed) are obtained. For example, the interface circuitry 502 (FIG. 2) may obtain the driver input steering wheel torque value 608 from the steering torque sensor 106 (FIGS. 1 and 2). In addition, the interface circuitry 502 may obtain the road wheel speed value 612 from the speed sensor 110 (FIG. 1) and/or from the ABS controller 118.

At the example RWAngle selection process 602, the steering-torque-based steering controller circuitry 522 accesses the driver input steering wheel torque value 608 and the road wheel speed value 612. The steering-torque-based steering controller circuitry 522 selects a target RWAngle value (e.g., a steering pinion angle value indicative of how much the road wheels 108*a,b* are to be turned by the road wheel actuator 102 of FIGS. 1 and 2) based on the driver input steering wheel torque value 608 and the road wheel speed value 612. For example, the steering-torque-based steering controller circuitry 522 may be provided with a "torque-to-RWAngle versus speed" mapping data structure (e.g., a lookup table) that stores different RWAngle versus speed mappings in association with corresponding driver input steering wheel torque values. For example, a first driver input steering wheel torque value is stored in association with an array of RWAngle versus speed mappings that indicate target RWAngles for corresponding speeds for that first driver input steering wheel torque value. Similarly, a second driver input steering wheel torque value is stored in association with another array of RWAngle versus speed mappings that indicate other target RWAngles for corresponding speeds for that second driver input steering wheel torque value.

In some examples, the "torque-to-RWAngle versus speed" mapping data structure includes gain factors for the driver input steering wheel torque value 608 and the road wheel speed value 612 to normalize the values to particular levels. This can be used to calibrate different vehicles based on different vehicle design characteristics, different steering conditions, different vehicle handling preferences, etc. This also allows implementing a driver-preference feature that allows selection of driver-preference tuning (e.g., a sport mode, a comfort mode, etc.). In some examples, for higher vehicle speeds, the "torque-to-RWAngle versus speed" mapping data structure maps lower driver input steering wheel torques to smaller RWAngles. In some examples, for lower vehicle speeds, the "torque-to-RWAngle versus speed" mapping data structure maps lower driver input steering wheel torques to larger RWAngles.

After the steering-torque-based steering controller circuitry 522 accesses a corresponding RWAngle versus speed mapping from the "torque-to-RWAngle versus speed" mapping data structure based on the driver input steering wheel torque value 608 and uses the mapping to select a target RWAngle that corresponds to the road wheel speed value 612, the steering-torque-based steering controller circuitry 522 provides the target RWAngle as a steer command from the RWAngle selection process 602 to the saturation limitation process 604.

At the saturation limitation process 604, the saturation limiter circuitry 512 limits the target RWAngle value in the target RWAngle steer command to a maximum RWAngle capability (e.g., maximum physical RWAngle limit) of the road wheel actuator 102. For example, if the target RWAngle steer command indicates a RWAngle value of 60 degrees but the maximum physical RWAngle actuatable by the road wheel actuator 102 is 45 degrees, the saturation limiter circuitry 512 replaces the 60-degree target RWAngle value in the target RWAngle steer command with a 45-degree target RWAngle value. In some examples, the steering-torque-based steering controller circuitry 522 is provided with mappings of different maximum RWAngle values to different road wheel speed values. As such, the saturation limiter circuitry 512 can limit target RWAngle values to maximum RWAngles based on the road wheel speed value 612. For example, the maximum RWAngle of the vehicle 100 may be smaller at faster speeds than at slower speeds. In some examples, saturation limits can be set by external controllers (e.g., a stability control system can detect terminal understeer and limit further increases in road wheel angle).

The saturation limiter circuitry 512 provides the saturation-processed target RWAngle steer command from the saturation limitation process 604 to the rate limitation process 606. At the rate limitation process 606, the rate limiter circuitry 514 limits a rate of change associated with the target RWAngle value based on a threshold slew rate corresponding to a prior, fully rotatable steering wheel. That is, the rate limiter circuitry 514 limits the mechanical slew rate of the RWAngle that is to be implemented by the road wheel actuator 102 based on a typical rate of rotation of a prior, fully rotatable steering wheel operated by a human being. For example, to closely emulate a steering maneuver that could be performed by a human driver using a prior, fully rotatable steering wheel, the rate limiter circuitry 514 may be provided with a mapping of RWAngle change rates to different road wheel speed values. For example, a faster RWAngle change rate may be allowed at slower road wheel speeds than at faster road wheel speeds. The rate limiter circuitry 514 uses such mapped values to limit the target RWAngle steer command to a RWAngle that does not cause exceeding of a threshold RWAngle change rate based on a current RWAngle. For example, if the difference between the target RWAngle of the target RWAngle steer command and a current RWAngle implemented by the road wheel actuator 102 corresponds to a RWAngle change rate that exceeds a maximum threshold RWAngle change rate specified in the rate limiter circuitry 514, the rate limiter circuitry 514 limits how quickly the target RWAngle in the target RWAngle steer command is achieved by implementing the target RWAngle at a slower rate that does not cause the RWAngle change rate to exceed the maximum threshold RWAngle change rate. After the rate limiter circuitry 514 processes the saturation-processed target RWAngle steer command from the saturation limiter circuitry 512, the steering-torque-based steering controller circuitry 522 creates an example final RWAngle steer command 614 and provides the final RWAngle steer command 614 to the road wheel actuator 102.

Implementing the saturation limitation process 604 and the rate limitation process 606 as disclosed herein provides steering maneuvers based on the spring-to-center steering wheel 202 that are familiar to drivers relative to vehicle movements and direction transitions associated with fully rotatable steering wheels. As such, examples disclosed herein can make the steering results of the spring-to-center steering wheel 202 to be substantially similar or identical to steering results of prior, fully rotatable steering wheels. Accordingly, in some examples, the steer commands generated by the steer command controller 107 can be referred to as virtual steering angle commands because the steer commands mimic or reflect steering angles produceable with prior, fully rotatable steering wheels.

The operations of the steering-torque-based steering control diagram 600 can be executed continuously during a driving session of the vehicle 100 to monitor the driver input steering wheel torque 608 and the road wheel speed 612 and continuously generate corresponding RWAngle steer commands 614 to steer the vehicle 100. The operations of the steering-torque-based steering control diagram 600 may end when the vehicle 100 is placed in a park mode and/or is turned off.

Figure 7:
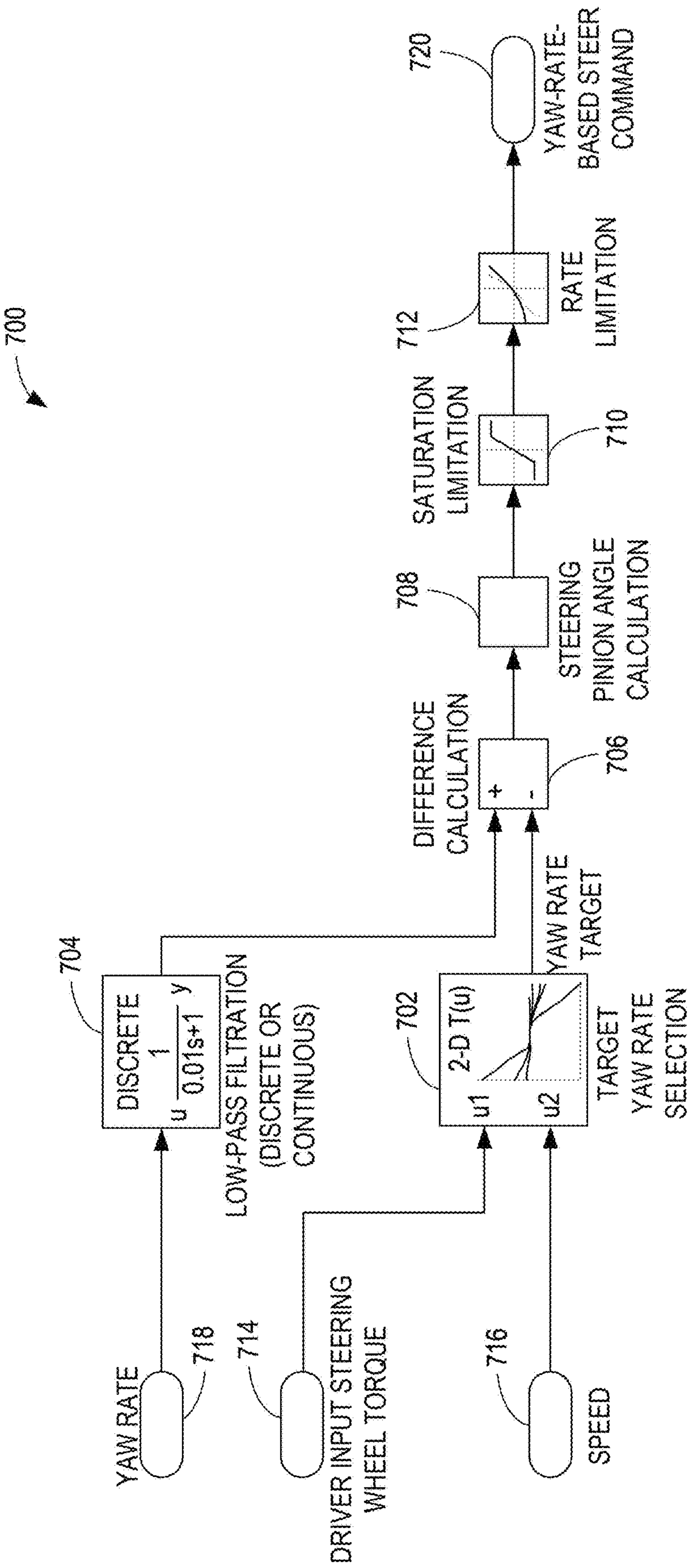
FIG. 7 is an example yaw-rate-based steering control diagram that may be used to implement the steer command controller of FIG. 5 to generate steer commands based on a yaw rate of the vehicle of FIG. 1.

FIG. 7 is an example yaw-rate-based steering control diagram 700 that may be used to implement the steer command controller 107 of FIG. 5 to generate steer commands based on a yaw rate of the vehicle 100 of FIG. 1 using a yaw-rate-based steering control model. The yaw-rate-based steering control diagram 700 shows an example process implementation of the yaw-rate-based steering controller circuitry 524 to translate input values into steering commands and/or powertrain/brake torque commands (e.g., as part of a feedforward controller) and control actual yaw rate of the vehicle 100 to satisfy a target yaw rate (e.g., as part of a feedback controller). The yaw-rate-based steering control diagram 700 includes an example target yaw rate selection process 702, an example low-pass filtration process 704, an example difference calculation process 706, an example steering pinion angle calculation process 708, an example saturation limitation process 710, and an example rate limitation process 712.

In the example of FIG. 7, an example driver input steering wheel torque value 714, an example road wheel speed value 716 (e.g., a vehicle speed), and an example yaw rate signal 718 are obtained. For example, the interface circuitry 502 (FIG. 2) may obtain the driver input steering wheel torque value 714 from the steering torque sensor 106 (FIGS. 1 and 2). The interface circuitry 502 may obtain the road wheel speed value 716 from the speed sensor 110 (FIG. 1) and/or from the ABS controller 118. The interface circuitry 502 may obtain the yaw rate signal 718 from the yaw rate sensor 112 (FIG. 1) and/or from the ABS controller 118.

At the target yaw rate selection process 702, the yaw-rate-based steering controller circuitry 524 accesses the driver input steering wheel torque value 714 and the road wheel speed value 716. The yaw-rate-based steering controller circuitry 524 selects a target yaw rate value (e.g., the change in yaw travel of the vehicle 100) based on the driver input steering wheel torque value 714 and the road wheel speed value 716. For example, the yaw-rate-based steering controller circuitry 524 may be provided with a "torque-to-yaw rate versus speed" mapping data structure (e.g., a lookup table) that stores different yaw rate versus speed mappings in association with corresponding driver input steering wheel torque values. For example, a first driver input steering wheel torque value is stored in association with an array of yaw rate versus speed mappings that indicate target yaw rates for corresponding speeds for that first driver input steering wheel torque value. Similarly, a second driver input steering wheel torque value is stored in association with another array of yaw rate versus speed mappings that indicate other target yaw rates for corresponding speeds for that second driver input steering wheel torque value. Any number of yaw rate versus speed mappings can be stored in association with corresponding driver input steering wheel torque values in the yaw-rate-based steering controller circuitry 524. Accordingly, after receipt of the driver input steering wheel torque value 714, the yaw-rate-based steering controller circuitry 524 accesses a yaw rate versus speed mapping from the "torque-to-yaw rate versus speed" mapping data structure based on the driver input steering wheel torque value 714 and uses the mapping to select a target yaw rate that corresponds to the road wheel speed value 716.

In some examples, the "torque-to-yaw rate versus speed" mapping data structure includes gain factors for the driver input steering wheel torque value 714 and the road wheel speed value 716 to normalize those values to particular levels. This can be used to calibrate different vehicles based on different vehicle design characteristics, different steering conditions, different vehicle handling preferences, etc.

At the low-pass filtration process 704, the interface circuitry 502 obtains the yaw rate signal 718 from the yaw rate sensor 112 and/or from the ABS controller 118 and the low-pass filter circuitry 506 performs low-pass filtration on the yaw rate signal 718 to remove high-frequency noise and generate a measured yaw rate value. The measured yaw rate value is representative of a current yaw rate of the vehicle 100. The low-pass filtration process 704 can be based on continuous signals or discrete signals. In some examples, signal filtration is performed at the yaw rate sensor 112 and/or the ABS controller 118 and the low-pass filtration process 704 is omitted or used for second-stage filtration of the yaw rate signal 718.

At the difference calculation process 706, the arithmetic logic circuitry 508 obtains a measured yaw rate value from the low-pass filtration process 704 and the target yaw rate value from the target yaw rate selection process 702. The arithmetic logic circuitry 508 determines a yaw rate difference value by calculating a difference between the measured yaw rate value and the target yaw rate value.

At the steering pinion angle calculation process 708, the closed-loop controller circuitry 510 calculates target steering pinon angles (e.g., also referred to as RWAngles to be created by the rack and pinion system 206 of FIG. 2) to turn the road wheels 108*a,b* of the vehicle 100. The closed-loop controller circuitry 510 inserts the target steering pinion angles (e.g., road wheel angles) in yaw-rate-based steering commands to be sent to the road wheel actuator 102.

At the steering pinion angle calculation process 708, the closed-loop controller circuitry 510 implements a closed-loop PID process to determine target steering pinion angle values based on the yaw rate difference values from the difference calculation process 706. For example, as the actual yaw rate of the vehicle 100 is measured over time, the closed-loop controller circuitry 510 implements a feedback control loop based on the yaw rate difference values from the difference calculation process 706 and determines the target steering pinion angle values to decrease the yaw rate difference between the measured yaw rate and the target yaw rate over that time frame. The closed-loop controller circuitry 510 generates yaw-rate-based steer commands that include the target steering pinion angle values. In some examples, the closed-loop controller circuitry 510 also includes powertrain torque commands and/or brake torque commands in the yaw-rate-based steer commands. Such powertrain torque commands and/or brake torque commands can be provided by the steer command controller 107 to a powertrain ECU and/or a brake system ECU to increase or decrease yaw rate of the vehicle 100 based on increasing/decreasing powertrain torque and/or brake torque.

In the example of FIG. 7, to implement the steering pinion angle calculation process 708, the closed-loop controller circuitry 510 is implemented as primarily a proportional (P) controller in which the integral (I) gain is set at approximately P/50,000 and the derivative (D) gain is set at zero. In other examples, the closed-loop controller circuitry 510 may be configured with different gains based on different tunings.

At the saturation limitation process 710, the saturation limiter circuitry 512 limits a target steering pinion angle value of the target yaw-rate-based steer command to a maximum steering pinion angle capability (e.g., a maximum physical steering pinion angle limit) of the road wheel actuator 102. For example, if the target steering pinion angle value indicates a steering pinion angle of 60 degrees but the maximum physical steering pinion angle actuatable by the road wheel actuator 102 is 45 degrees, the saturation limiter circuitry 512 replaces the 60-degree target steering pinion angle value of the target yaw-rate-based steer command with a 45-degree target steering pinion angle value. In some examples, the saturation limiter circuitry 512 is provided with mappings of different maximum target steering pinion angle values to different road wheel speed values. In such examples, the saturation limiter circuitry 512 can use those mappings to limit target steering pinion angle values to maximum steering pinion angles based on the road wheel speed value 716. In some examples, saturation limits can be set by external controllers (e.g., a stability control system can detect terminal understeer and limit further increases in road wheel angle).

The saturation limiter circuitry 512 provides a target yaw-rate-based steer command from the saturation limitation process 710 to the rate limitation process 712. At the rate limitation process 712, the rate limiter circuitry 514 limits a rate of change associated with the target steering pinion angle value based on a threshold slew rate corresponding to a prior, fully rotatable steering wheel. That is, the rate limiter circuitry 514 limits the mechanical slew rate of the steering pinion angle that is to be implemented by the road wheel actuator 102 based on a typical rate of rotation of a prior, fully rotatable steering wheel operated by a human being. For example, to closely emulate a steering maneuver that could be performed by a human driver using a prior, fully rotatable steering wheel, the rate limiter circuitry 514 may be provided with a mapping of steering pinion angle change rates to different road wheel speed values. In some examples, the mapped values reflect that a faster steering pinion angle change rate is allowable at slower road wheel speeds than at faster road wheel speeds. The rate limiter circuitry 514 uses such mapped values to limit the target steering pinion angle value in the yaw-rate-based steer command to a steering pinion angle value that does not cause exceeding of a threshold steering pinion angle change rate when adjusting from a current steering pinion angle. For example, if the difference between the target steering pinion angle value of the target yaw-rate-based steer command and a current steering pinion angle implemented by the road wheel actuator 102 corresponds to a steering pinion angle change rate that exceeds a maximum threshold steering pinion angle change rate specified in the rate limiter circuitry 514, the rate limiter circuitry 514 limits the target steering pinion angle value. For example, the rate limiter circuitry 514 limits how quickly the target steering pinion angle value in the target yaw-rate-based steer command is achieved so that the steering pinion angle change rate does not exceed the maximum threshold steering pinion angle change rate. In some examples, the rate limiter circuitry 514 resets if a subsequent target steering pinion angle value is reduced to less than a current target steering pinion angle value.

The yaw-rate-based steering controller circuitry 524 creates an example final yaw-rate-based steer command 720 and provides the final yaw-rate-based steer command 720 to the road wheel actuator 102. In the example of FIG. 7, the final yaw-rate-based steer command 720 is a pinion angle command that includes a steering pinion angle value to instruct the road wheel actuator 102 to actuate the rack and pinion system 206 to create a corresponding RWAngle at the road wheels 108*a,b*.

The operations of the yaw-rate-based steering control diagram 700 can be executed continuously during a driving session of the vehicle 100 to monitor the driver input steering wheel torque 714, the road wheel speed 716, and the yaw rate signal 718 and continuously generate corresponding yaw-rate-based steer commands 720 to steer the vehicle 100. The operations of the yaw-rate-based steering control diagram 700 may end when the vehicle 100 is placed in a park mode and/or is turned off.

Figure 8:
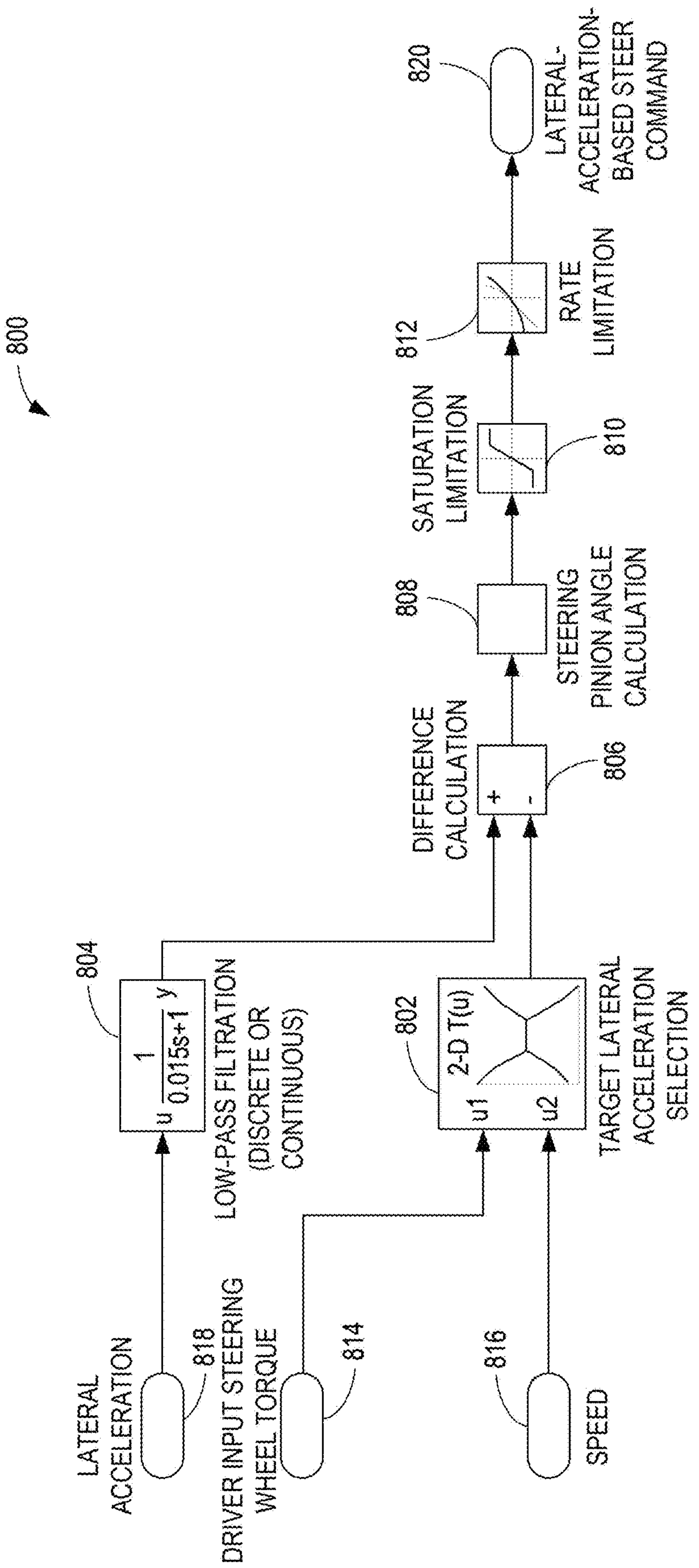
FIG. 8 is an example lateral-acceleration-based steering control diagram that may be used to implement the steer command controller of FIG. 5 to generate steer commands based on lateral acceleration of the vehicle of FIG. 1.

FIG. 8 is an example lateral-acceleration-based steering control diagram 800 that may be used to implement the steer command controller 107 of FIG. 5 to generate steer commands based on lateral acceleration (Ay) (e.g., lateral acceleration (Ay) at the center of gravity (CG)) of the vehicle 100 of FIG. 1 using a lateral-acceleration-based steering control model. The lateral-acceleration-based steering control diagram 800 shows an example process implementation of the lateral-acceleration-based steering controller circuitry 526 to translate input values into steering commands and/or powertrain/brake torque commands (e.g., as part of a feedforward controller) and control actual lateral acceleration of the vehicle 100 to satisfy a target lateral acceleration (e.g., as part of a feedback controller). The lateral-acceleration-based steering control diagram 800 includes an example target lateral acceleration selection process 802, an example low-pass filtration process 804, an example difference calculation process 806, an example steering pinion angle calculation process 808, an example saturation limitation process 810, and an example rate limitation process 812.

In the example of FIG. 8, an example driver input steering wheel torque value 814, an example road wheel speed value 816 (e.g., a vehicle speed), and an example lateral acceleration signal 818 are obtained. For example, the interface circuitry 502 (FIG. 2) may obtain the driver input steering wheel torque value 814 from the steering torque sensor 106 (FIGS. 1 and 2). The interface circuitry 502 may obtain the road wheel speed value 816 from the speed sensor 110 (FIG. 1) and/or from the ABS controller 118. The interface circuitry 502 may obtain the lateral acceleration signal 818 from the lateral acceleration sensor 114 and/or from the ABS controller 118.

At the target lateral acceleration selection process 802, the lateral-acceleration-based steering controller circuitry 526 accesses the driver input steering wheel torque value 814 and the road wheel speed value 816. The lateral-acceleration-based steering controller circuitry 526 selects a target lateral acceleration value (e.g., the change in lateral speed of the vehicle 100) based on the driver input steering wheel torque value 814 and the road wheel speed value 816. For example, the lateral-acceleration-based steering controller circuitry 526 may be provided with a "torque-to-lateral acceleration versus speed" mapping data structure (e.g., a lookup table) that stores different lateral acceleration versus speed mappings in association with corresponding driver input steering wheel torque values. For example, a first driver input steering wheel torque value is stored in association with an array of lateral acceleration versus speed mappings that indicate target lateral acceleration values for corresponding speeds for that first driver input steering wheel torque value. Similarly, a second driver input steering wheel torque value is stored in association with another array of lateral acceleration versus speed mappings that indicate other target lateral acceleration values for corresponding speeds for that second driver input steering wheel torque value. Any number of lateral acceleration versus speed mappings can be stored in association with corresponding driver input steering wheel torque values in the lateral-acceleration-based steering controller circuitry 526. Accordingly, after receipt of the driver input steering wheel torque value 814, the lateral-acceleration-based steering controller circuitry 526 accesses a lateral acceleration versus speed mapping from the "torque-to-lateral acceleration versus speed" mapping data structure based on the driver input steering wheel torque value 814 and uses that mapping to select a target lateral acceleration that corresponds to the road wheel speed value 816.

In some examples, the "torque-to-lateral acceleration versus speed" mapping data structure includes gain factors for the driver input steering wheel torque value 814 and the road wheel speed value 816 to normalize those values to particular levels. This can be used to calibrate different vehicles based on different vehicle design characteristics, different steering conditions, different vehicle handling preferences, different driver-selectable tuning modes (e.g., a sport mode, a comfort mode, etc.), etc.

At the low-pass filtration process 804, the interface circuitry 502 obtains the lateral acceleration signal 818 from the lateral acceleration sensor 114 and/or from the ABS controller 118 and the low-pass filter circuitry 506 performs low-pass filtration on the lateral acceleration signal 818 to remove high-frequency noise and generate a measured lateral acceleration value. The measured lateral acceleration value is representative of a current lateral acceleration of the vehicle 100. The low-pass filtration process 804 can be based on continuous signals or discrete signals. In some examples, signal filtration is performed at the lateral acceleration sensor 114 and/or the ABS controller 118 and the low-pass filtration process 804 is omitted or used for second-stage filtration of the lateral acceleration signal 818.

At the difference calculation process 806, the arithmetic logic circuitry 508 obtains a measured lateral acceleration value from the low-pass filtration process 804 and the target lateral acceleration value from the target lateral acceleration selection process 802. The arithmetic logic circuitry 508 determines a lateral acceleration difference value by calculating a difference between the measured lateral acceleration value and the target lateral acceleration value.

At the steering pinion angle calculation process 808, the closed-loop controller circuitry 510 calculates target steering pinon angles (e.g., also referred to as RWAngles to be created by the rack and pinion system 206 of FIG. 2) to turn the road wheels 108*a,b* of the vehicle 100. The closed-loop controller circuitry 510 inserts the target steering pinion angle values in lateral-acceleration-based steering commands to be sent to the road wheel actuator 102.

At the steering pinion angle calculation process 808, the closed-loop controller circuitry 510 implements a closed-loop PID process to determine target steering pinion angle values based on the lateral acceleration difference values from the difference calculation process 806. For example, as the actual lateral acceleration of the vehicle 100 is measured over time, the closed-loop controller circuitry 510 implements a feedback control loop based on the lateral acceleration difference values and determines the target steering pinion angle values to decrease the lateral acceleration difference between the measured lateral acceleration and the target lateral acceleration over that time frame. The closed-loop controller circuitry 510 generates lateral-acceleration-based steer commands that include the target steering pinion angle values. In some examples, the closed-loop controller circuitry 510 also includes powertrain torque commands and/or brake torque commands in the lateral-acceleration-based steer commands. Such powertrain torque commands and/or brake torque commands can be provided by the steer command controller 107 to a powertrain ECU and/or a brake system ECU to increase or decrease lateral acceleration of the vehicle 100 based on increasing/decreasing powertrain torque and/or brake torque.

In the example of FIG. 8, to implement the steering pinion angle calculation process 808, the closed-loop controller circuitry 510 is implemented as primarily a proportional-derivative (PD) controller in which the integral (I) gain is set at zero, the proportional (P) gain is set at approximately 10, and the derivative (D) gain is set at approximately 10. In other examples, the closed-loop controller circuitry 510 may be configured with different gains based on different tunings.

At the saturation limitation process 810, the saturation limiter circuitry 512 limits a target steering pinion angle value of the target lateral-acceleration-based steer command to a maximum steering pinion angle capability (e.g., a maximum physical steering pinion angle limit) of the road wheel actuator 102. For example, if the target steering pinion angle value indicates a steering pinion angle of 60 degrees but the maximum physical steering pinion angle actuatable by the road wheel actuator 102 is 45 degrees, the saturation limiter circuitry 512 replaces the 60-degree target steering pinion angle value of the target lateral-acceleration-based steer command with a 45-degree target steering pinion angle value. In some examples, the saturation limiter circuitry 512 is provided with mappings of different maximum target steering pinion angle values to different road wheel speed values. In such examples, the saturation limiter circuitry 512 can use those mappings to limit target steering pinion angle values to maximum steering pinion angles based on the road wheel speed value 716. In some examples, saturation limits can be set by external controllers (e.g., a stability control system can detect terminal understeer and limit further increases in road wheel angle).

The saturation limiter circuitry 512 provides a target lateral-acceleration-based steer command from the saturation limitation process 810 to the rate limitation process 812. At the rate limitation process 812, the rate limiter circuitry 514 limits a rate of change associated with the target steering pinion angle value based on a threshold slew rate corresponding to a prior, fully rotatable steering wheel. That is, the rate limiter circuitry 514 limits the mechanical slew rate of the steering pinion angle that is to be implemented by the road wheel actuator 102 based on a typical rate of rotation of a prior, fully rotatable steering wheel operated by a human being. For example, to closely emulate a steering maneuver that could be performed by a human driver using a prior, fully rotatable steering wheel, the rate limiter circuitry 514 may be provided with a mapping of steering pinion angle change rates to different road wheel speed values. In some examples, the mapped values reflect that a faster steering pinion angle change rate is allowable at slower road wheel speeds than at faster road wheel speeds. The rate limiter circuitry 514 uses such mapped values to limit the target steering pinion angle in the lateral-acceleration-based steer command to a steering pinion angle that does not cause exceeding of a threshold steering pinion angle change rate when adjusting from a current steering pinion angle. For example, if the difference between the target steering pinion angle value of the target lateral-acceleration-based steer command and a current steering pinion angle implemented by the road wheel actuator 102 corresponds to a steering pinion angle change rate that exceeds a maximum threshold steering pinion angle change rate specified in the rate limiter circuitry 514, the rate limiter circuitry 514 limits the target steering pinion angle value. For example, the rate limiter circuitry 514 limits how quickly the target steering pinion angle value in the target lateral-acceleration-based steer is achieved so that the steering pinion angle change rate does not exceed the maximum threshold steering pinion angle change rate. In some examples, the rate limiter circuitry 514 resets if a subsequent target steering pinion angle value is reduced to less than a current target steering pinion angle value.

The lateral-acceleration-based steering controller circuitry 526 creates an example final lateral-acceleration-based steer command 820 and provides the final lateral-acceleration-based steer command 820 to the road wheel actuator 102. In the example of FIG. 8, the final lateral-acceleration-based steer command 820 is a pinion angle command that includes a steering pinion angle value to instruct the road wheel actuator 102 to actuate the rack and pinion system 206 to create a corresponding RWAngle at the road wheels 108*a,b*.

The operations of the lateral-acceleration-based steering control diagram 800 can be executed continuously during a driving session of the vehicle 100 to monitor the driver input steering wheel torque 814, the road wheel speed 816, and the lateral acceleration signal 818 and continuously generate corresponding lateral-acceleration-based steer commands 820 to steer the vehicle 100. The operations of the lateral-acceleration-based steering control diagram 800 may end when the vehicle 100 is placed in a park mode and/or is turned off.

Figure 9:
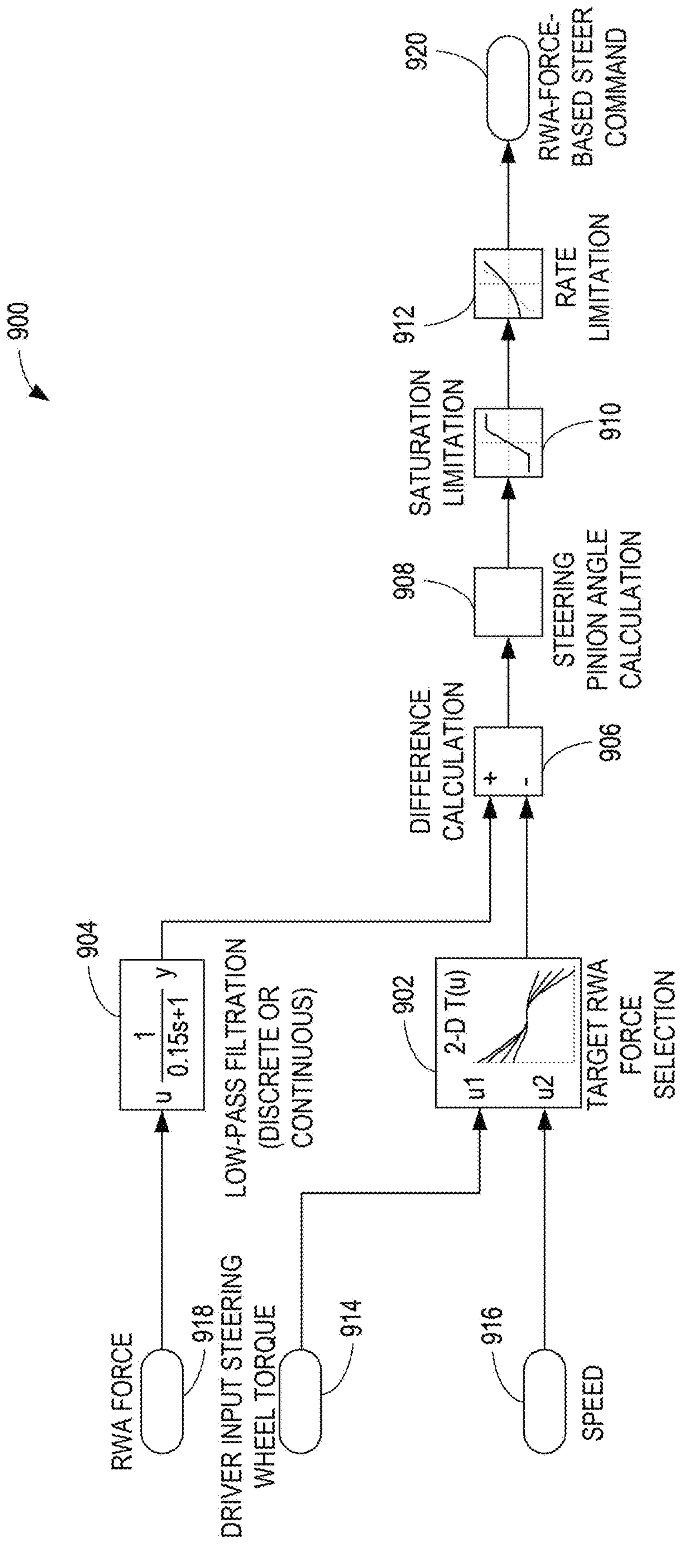
FIG. 9 is an example road wheel actuator force-based steering control diagram that may be used to implement the steer command controller of FIG. 5 to generate steer commands based on road wheel actuator force of the vehicle of FIG. 1.

FIG. 9 is an example RWA-force-based steering control diagram 900 that may be used to implement the steer command controller 107 of FIG. 5 to generate steer commands based on RWA force of the vehicle 100 of FIG. 1 using a RWA-force-based steering control model. The RWA-force-based steering control diagram 900 shows an example process implementation of the RWA-force-based steering controller circuitry 528 to translate input values into steering commands and/or powertrain/brake torque commands (e.g., as part of a feedforward controller) and control an actual RWA force of the vehicle 100 to satisfy a target RWA force (e.g., as part of a feedback controller). The RWA-force-based steering control diagram 900 includes an example target RWA force selection process 902, an example low-pass filtration process 904, an example difference calculation process 906, an example steering pinion angle calculation process 908, an example saturation limitation process 910, and an example rate limitation process 912. In some examples, the processes of the RWA-force-based steering control diagram 900 are implemented at the road wheel actuator 102 due to its close proximity to the rack and pinion system 206. In other examples, the processes of the RWA-force-based steering control diagram 900 are implemented at individual wheel actuators located at corresponding ones of the road wheels 108*a,b* of a two-wheel steer vehicle or at corresponding ones of all four wheels of a four-wheel steer vehicle.

In the example of FIG. 9, an example driver input steering wheel torque value 914, an example road wheel speed value 916 (e.g., a vehicle speed), and an example RWA force signal 918 are obtained. For example, the interface circuitry 502 may obtain the driver input steering wheel torque value 914 from the steering torque sensor 106 (FIGS. 1 and 2). The interface circuitry 502 may obtain the road wheel speed value 916 from the speed sensor 110 (FIG. 1) and/or from the ABS controller 118. The interface circuitry 502 may obtain the RWA force signal 918 from the RWA force sensor 116.

At the target RWA force selection process 902, the RWA-force-based steering controller circuitry 528 accesses the driver input steering wheel torque value 914 and the road wheel speed value 916. The RWA-force-based steering controller circuitry 528 selects a target RWA force value (e.g., the amount of force feedback from the road wheels 108*a,b* to the rack and pinion system 206) based on the driver input steering wheel torque value 914 and the road wheel speed value 916. For example, the RWA-force-based steering controller circuitry 528 may be provided with a "torque-to-RWA force versus speed" mapping data structure (e.g., a lookup table) that stores different RWA force versus speed mappings in association with corresponding driver input steering wheel torque values. For example, a first driver input steering wheel torque value is stored in association with an array of RWA force versus speed mappings that indicate target RWA force values for corresponding speeds for that first driver input steering wheel torque value. Similarly, a second driver input steering wheel torque value is stored in association with another array of RWA force versus speed mappings that indicate other target RWA force values for corresponding speeds for that second driver input steering wheel torque value. Any number of RWA force versus speed mappings can be stored in association with corresponding driver input steering wheel torque values in the RWA-force-based steering controller circuitry 528. Accordingly, after receipt of the driver input steering wheel torque value 914, the RWA-force-based steering controller circuitry 528 accesses a RWA force versus speed mapping from the "torque-to-RWA force versus speed" mapping data structure based on the driver input steering wheel torque value 914 and uses that mapping to select a target RWA force that corresponds to the road wheel speed value 916.

In some examples, the "torque-to-RWA force versus speed" mapping data structure includes gain factors for the driver input steering wheel torque value 914 and the road wheel speed value 916 to normalize those values to particular levels. This can be used to calibrate different vehicles based on different vehicle design characteristics, different steering conditions, different vehicle handling preferences, etc.

At the low-pass filtration process 904, the interface circuitry 502 obtains the RWA force signal 918 from the RWA force sensor 116 and/or from the ABS controller 118 and the low-pass filter circuitry 506 performs low-pass filtration on the RWA force signal 918 to remove high-frequency noise and generate a measured RWA force value. The measured RWA force value is representative of a current RWA force of the vehicle 100. The low-pass filtration process 904 can be based on continuous signals or discrete signals. In some examples, signal filtration is performed at the RWA force sensor 116 and/or the ABS controller 118 and the low-pass filtration process 904 is omitted or used for second-stage filtration of the RWA force signal 918.

At the difference calculation process 906, the arithmetic logic circuitry 508 obtains a measured RWA force value from the low-pass filtration process 904 and the target RWA force value from the target RWA force selection process 902. The arithmetic logic circuitry 508 determines a RWA force difference value by calculating a difference between the measured RWA force value and the target RWA force value. In some examples, the arithmetic logic circuitry 508 determines the RWA force difference value based on a measurement value of the amount of electrical current being consumed by a motor of the road wheel actuator 102. For example, when the electrical current of the motor is zero, the arithmetic logic circuitry 508 determines that the RWA force value is zero because the vehicle 100 is traveling in a direction intended by the road wheel angle of the road wheels 108*a,b* without a considerable amount of yaw or lateral resistance. When the vehicle 100 is not traveling in a direction intended by the road wheel angle of the road wheels 108*a,b* or is experiencing significant yaw or lateral resistance, a counteracting force is exerted on the rack and pinion system 206 which causes the motor of the road wheel actuator 102 to consume electrical current to work against the counteracting force. Based on an electrical current measurement value of this electrical current drawn by the motor, the arithmetic logic circuitry 508 determines the RWA force difference value as a corresponding non-zero value.

At the steering pinion angle calculation process 908, the closed-loop controller circuitry 510 calculates target steering pinon angles (e.g., also referred to as RWAngles to be created by the rack and pinion system 206 of FIG. 2) to turn the road wheels 108*a,b* of the vehicle 100. The closed-loop controller circuitry 510 inserts the target steering pinion angles in RWA-force-based steering commands to be sent to the road wheel actuator 102.

At the steering pinion angle calculation process 908, the closed-loop controller circuitry 510 implements a closed-loop PID process to determine target steering pinion angle values based on RWA force difference values from the difference calculation process 906. For example, as the actual RWA force of the vehicle 100 is measured over time, the closed-loop controller circuitry 510 implements a feedback control loop based on the RWA force difference values and determines the target steering pinion angle values to decrease the RWA force difference between the measured RWA force and the target RWA force over that time frame. The closed-loop controller circuitry 510 generates RWA-force-based steer commands that include the target steering pinion angle values. In some examples, the closed-loop controller circuitry 510 also includes powertrain torque commands and/or brake torque commands in the RWA-force-based steer commands. Such powertrain torque commands and/or brake torque commands can be provided by the steer command controller 107 to a powertrain ECU and/or a brake system ECU to increase or decrease RWA force of the vehicle 100 based on increasing/decreasing powertrain torque and/or brake torque.

In the example of FIG. 9, to implement the steering pinion angle calculation process 908, the closed-loop controller circuitry 510 is implemented as primarily a proportional (P) controller in which the integral (I) gain is set at approximately P/100 and the derivative (D) gain is set at approximately P/10,000. In other examples, the closed-loop controller circuitry 510 may be configured with different gains based on different tunings.

At the saturation limitation process 910, the saturation limiter circuitry 512 limits a target steering pinion angle value of the target RWA-force-based steer command to a maximum steering pinion angle capability (e.g., a maximum physical steering pinion angle limit) of the road wheel actuator 102. For example, if the target steering pinion angle value indicates a steering pinion angle of 60 degrees but the maximum physical steering pinion angle actuatable by the road wheel actuator 102 is 45 degrees, the saturation limiter circuitry 512 replaces the 60-degree target steering pinion angle value of the target RWA-force-based steer command with a 45-degree target steering pinion angle value. In some examples, the saturation limiter circuitry 512 is provided with mappings of different maximum target steering pinion angle values to different road wheel speed values. In such examples, the saturation limiter circuitry 512 can use those mappings to limit target steering pinion angle values to maximum steering pinion angles based on the road wheel speed value 716. In some examples, saturation limits can be set by external controllers (e.g., a stability control system can detect terminal understeer and limit further increases in road wheel angle). In some examples, the saturation limiter circuitry 512 limits road wheel angle in case of limit understeer.

The saturation limiter circuitry 512 provides a target RWA-force-based steer command from the saturation limitation process 910 to the rate limitation process 912. At the rate limitation process 912, the rate limiter circuitry 514 limits a rate of change associated with the target steering pinion angle value based on a threshold slew rate corresponding to a prior, fully rotatable steering wheel. That is, the rate limiter circuitry 514 limits the mechanical slew rate of the steering pinion angle that is to be implemented by the road wheel actuator 102 based on a typical rate of rotation of a prior, fully rotatable steering wheel operated by a human being. For example, to closely emulate a steering maneuver that could be performed by a human driver using a prior, fully rotatable steering wheel, the rate limiter circuitry 514 may be provided with a mapping of steering pinion angle change rates to different road wheel speed values. In some examples, the mapped values reflect that a faster steering pinion angle change rate is allowable at slower road wheel speeds than at faster road wheel speeds. The rate limiter circuitry 514 uses such mapped values to limit the target steering pinion angle in the RWA-force-based steer command to a steering pinion angle that does not cause exceeding of a threshold steering pinion angle change rate when adjusting from a current steering pinion angle. For example, if the difference between the target steering pinion angle value of the target RWA-force-based steer command and a current steering pinion angle implemented by the road wheel actuator 102 corresponds to a steering pinion angle change rate that exceeds a maximum threshold steering pinion angle change rate specified in the rate limiter circuitry 514, the rate limiter circuitry 514 limits the target steering pinion angle value. For example, the rate limiter circuitry 514 limits how quickly the target steering pinion angle value in the target RWA-force-based steer command is achieved so that the steering pinion angle change rate does not exceed the maximum threshold steering pinion angle change rate. In some examples, the rate limiter circuitry 514 resets if a subsequent target steering pinion angle value is reduced to less than a current target steering pinion angle value.

The RWA-force-based steering controller circuitry 528 creates an example final RWA-force-based steer command 920 and provides the final RWA-force-based steer command 920 to the road wheel actuator 102. In the example of FIG. 9, the final RWA-force-based steer command 920 is a pinion angle command that includes a steering pinion angle value to instruct the road wheel actuator 102 to actuate the rack and pinion system 206 to create a corresponding RWAngle at the road wheels 108*a,b*.

In examples disclosed herein, the processes of the RWA-force-based steering control diagram 900 are useful in multiple steering scenarios. For example, when a driver releases the spring-to-center steering wheel 202 following a turn, the processes of the RWA-force-based steering control diagram 900 allow the RWAngle of the road wheels 108*a,b* to naturally follow caster back to straight ahead. In examples disclosed herein, caster refers to a force exerted by the road wheels 108*a,b* to return back to a zero-degree RWAngle and travel along a straight path due to suspension geometry and/or tire effects.

The operations of the RWA-force-based steering control diagram 900 can be executed continuously during a driving session of the vehicle 100 to monitor the driver input steering wheel torque 914, the road wheel speed 916, and the RWA force signal 918 and continuously generate corresponding RWA-force-based steer commands 920 to steer the vehicle 100. The operations of the RWA-force-based steering control diagram 900 may end when the vehicle 100 is placed in a park mode and/or is turned off.

Flowcharts representative of example machine-readable instructions, which may be executed by programmable circuitry to implement and/or instantiate the steer command controller 107 of FIG. 5 and/or representative of example operations which may be performed by programmable circuitry to implement and/or instantiate the steer command controller 107 of FIG. 5, are shown in FIGS. 10-13. The machine-readable instructions may be one or more executable program(s) or portion(s) of one or more executable program(s) for execution by programmable circuitry such as the programmable circuitry 1412 shown in the example processor platform 1400 discussed below in connection with FIG. 14 and/or may be one or more function(s) or portion(s) of functions to be performed by the example programmable circuitry (e.g., an FPGA) discussed below in connection with FIGS. 15 and/or 16. In some examples, the machine-readable instructions cause an operation, a task, etc., to be carried out and/or performed in an automated manner in the real world. As used herein, "automated" means without human involvement.

The program(s) may be embodied in instructions (e.g., software and/or firmware) stored on one or more non-transitory computer-readable and/or machine-readable storage media such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, read-only memory (ROM), a solid-state drive (SSD), non-volatile memory (e.g., electrically erasable programmable ROM (EEPROM), flash memory, etc.), volatile memory (e.g., Random Access Memory (RAM) of any type, etc.), and/or any other storage device or storage disk. The non-transitory computer-readable storage medium may include one or more mediums and/or types of mediums. The instructions of the non-transitory computer-readable and/or machine-readable medium may be executed and/or instantiated by one or more hardware devices other than the programmable circuitry and/or may be embodied in dedicated hardware. For example, any or all of the blocks of the flowchart(s) may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform corresponding operations without executing software or firmware.

Although the example program(s) is/are described with reference to the flowcharts illustrated in FIGS. 10-13, many other methods of implementing the example steer command controller 107 may alternatively be used. For example, the order of execution of the blocks of the flowcharts may be changed, and/or some of the blocks described may be changed, eliminated, or combined.

The machine-readable instructions may be distributed across multiple hardware devices and/or executed by two or more hardware devices (e.g., a server and a client hardware device). The programmable circuitry may be distributed in different network locations and/or may be local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

Machine-readable instructions as described herein may be stored as data and/or in a data structure (e.g., as portion(s) of instructions, code, representations of code, etc.) on one or more storage devices, disks and/or computing devices (e.g., servers) located at the same or different locations of a network or collection of networks (e.g., in the cloud, in edge devices, etc.).

The machine-readable instructions described herein can be written or represented using any suitable previously developed or future-developed instruction language, scripting language, programming language, etc. including, for example, C, C++, Java, C-Sharp, Perl, Python, JavaScript, Hyper Text Markup Language (HTML), Structured Query Language (SQL), Swift, model-based design (e.g., Simulink), etc.

As mentioned above, the example operations of FIGS. 10-13 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc. As used herein, the term "storage disk" refers to a physical structure containing information storage elements to which information can be written and persisted for subsequent retrieval by a computer or other hardware platform. Examples of non-transitory computer-readable medium, non-transitory computer-readable storage medium, non-transitory machine-readable medium, non-transitory machine-readable storage medium, non-transitory computer-readable storage devices, non-transitory machine-readable storage devices, non-transitory computer-readable storage disk, and/or non-transitory machine-readable storage disk include any one of or combination of random access memory (RAM) of any type, read only memory (ROM) of any type, solid state memory, flash memory, optical discs (e.g., a CD, a DVD, etc.), magnetic disks (e.g., magnetic HDDs), disk drives, cache, registers, redundant array of independent disks (RAID) systems, and/or any other non-transitory computer-readable and/or machine-readable media in which information is stored for any duration (e.g., for extended time periods, permanently, for brief instances, for temporarily buffering, and/or for caching of the information).

Figure 10:
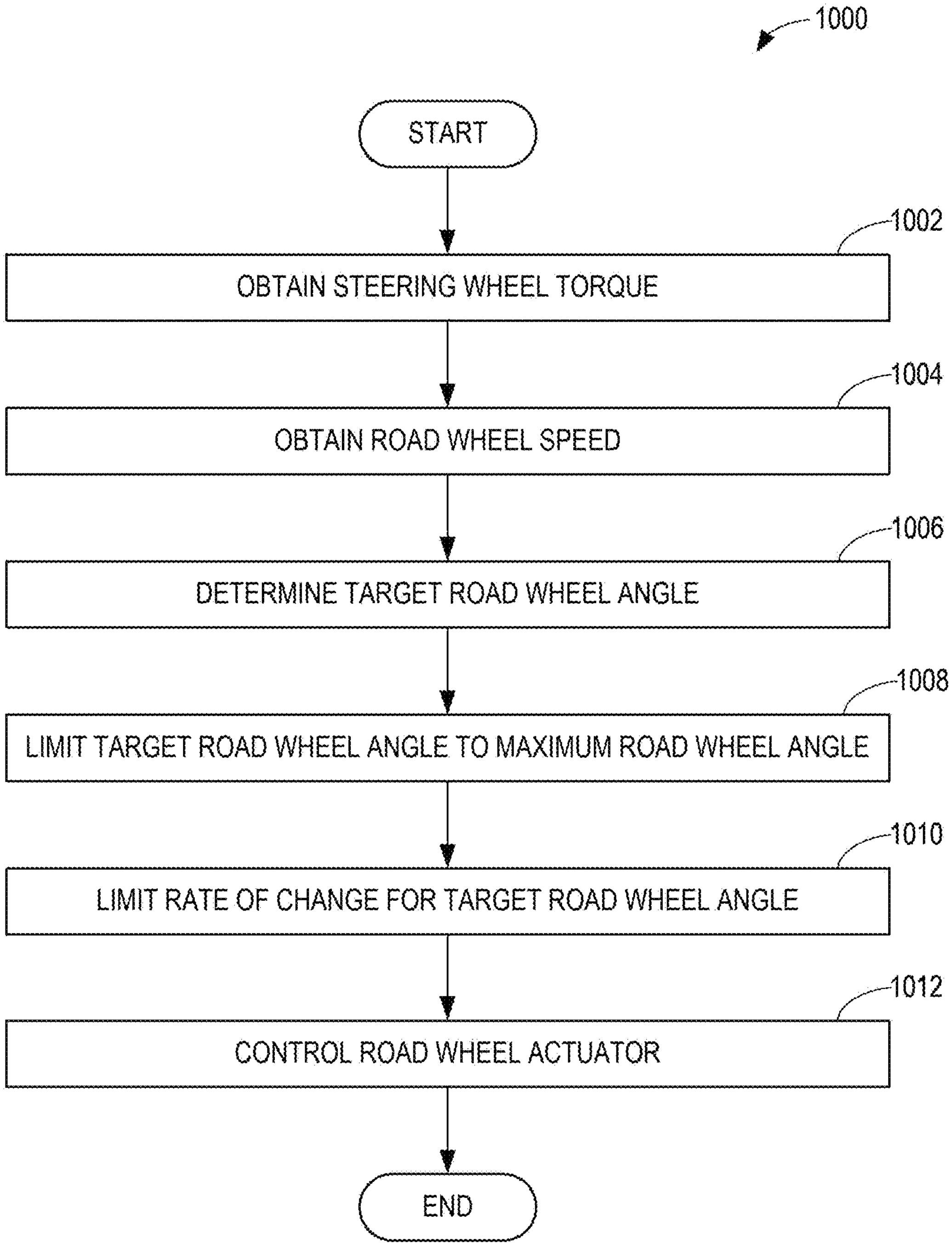
FIG. 10 is a flowchart representative of example machine-readable instructions and/or example operations that may be executed, instantiated, and/or performed by example programmable circuitry to implement the steer command controller of FIG. 5 to generate steer commands based on driver input steering wheel torque.

FIG. 10 is a flowchart representative of example machine-readable instructions and/or example operations 1000 that may be executed, instantiated, and/or performed by programmable circuitry to implement the steer command controller 107 of FIG. 5 to generate steer commands based on driver input steering wheel torque. In some examples, the instructions and/or operations 1000 may be implemented based on the steering-torque-based steering control diagram 600 of FIG. 6. The instructions and/or operations 1000 begin at block 1002 at which the interface circuitry 502 obtains the driver input steering wheel torque value 608. The driver input steering wheel torque value 608 corresponds to torque produced via the spring-to-center steering wheel 202.

At block 1004, the interface circuitry 502 obtains the road wheel speed value 612. At block 1006, the steering-torque-based steering controller circuitry 522 determines a target RWAngle value. For example, the steering-torque-based steering controller circuitry 522 determines the target RWAngle value (e.g., a target steering pinion angle value) based on the driver input steering wheel torque value 608 and the road wheel speed value 612 as described above in connection with the RWAngle selection process 602 of FIG. 6.

At block 1008, the saturation limiter circuitry 512 limits the target RWAngle value to a maximum RWAngle. For example, the saturation limiter circuitry 512 limits the target RWAngle value of block 1006 to a maximum RWAngle capability (e.g., a maximum physical RWAngle limit, a maximum steering pinion angle capability) of the road wheel actuator 102 as described above in connection with the saturation limitation process 604 of FIG. 6. At block 1010, the rate limiter circuitry 514 limits a rate of change associated with the target RWAngle value. For example, the rate limiter circuitry 514 limits the rate of change of the target RWAngle value based on a threshold slew rate corresponding to a prior, fully rotatable steering wheel as described above in connection with the rate limitation process 606 of FIG. 6.

At block 1012, the steering-torque-based steering controller circuitry 522 controls the road wheel actuator 102 to turn the road wheels 108*a,b* based on the target RWAngle value. For example, the steering-torque-based steering controller circuitry 522 can provide the target RWAngle value in the RWAngle steer command 614 and cause the interface circuitry 502 to send the RWAngle steer command 614 to the road wheel actuator 102. Accordingly, the road wheel actuator 102 can control the rack and pinion system 206 to turn the road wheels 108*a,b* based on the target RWAngle value in the RWAngle steer command 614. The instructions and/or operations 1000 end.

The instructions and/or operations 1000 can be repeated multiple times (e.g., a loop execution) throughout a driving session. For example, the driver input steering wheel torque 608 and the road wheel speed 612 of the vehicle 100 can be continuously monitored and the instructions and/or operations 1000 can be repeated continuously to generate RWAngle steer commands 614 based on the most recently obtained driver input steering wheel torque 608 and road wheel speed 612. In some examples, the loop execution of the instructions and/or operations 1000 ends when the vehicle 100 is placed into a park mode and/or the vehicle 100 is turned off.

Figure 11:
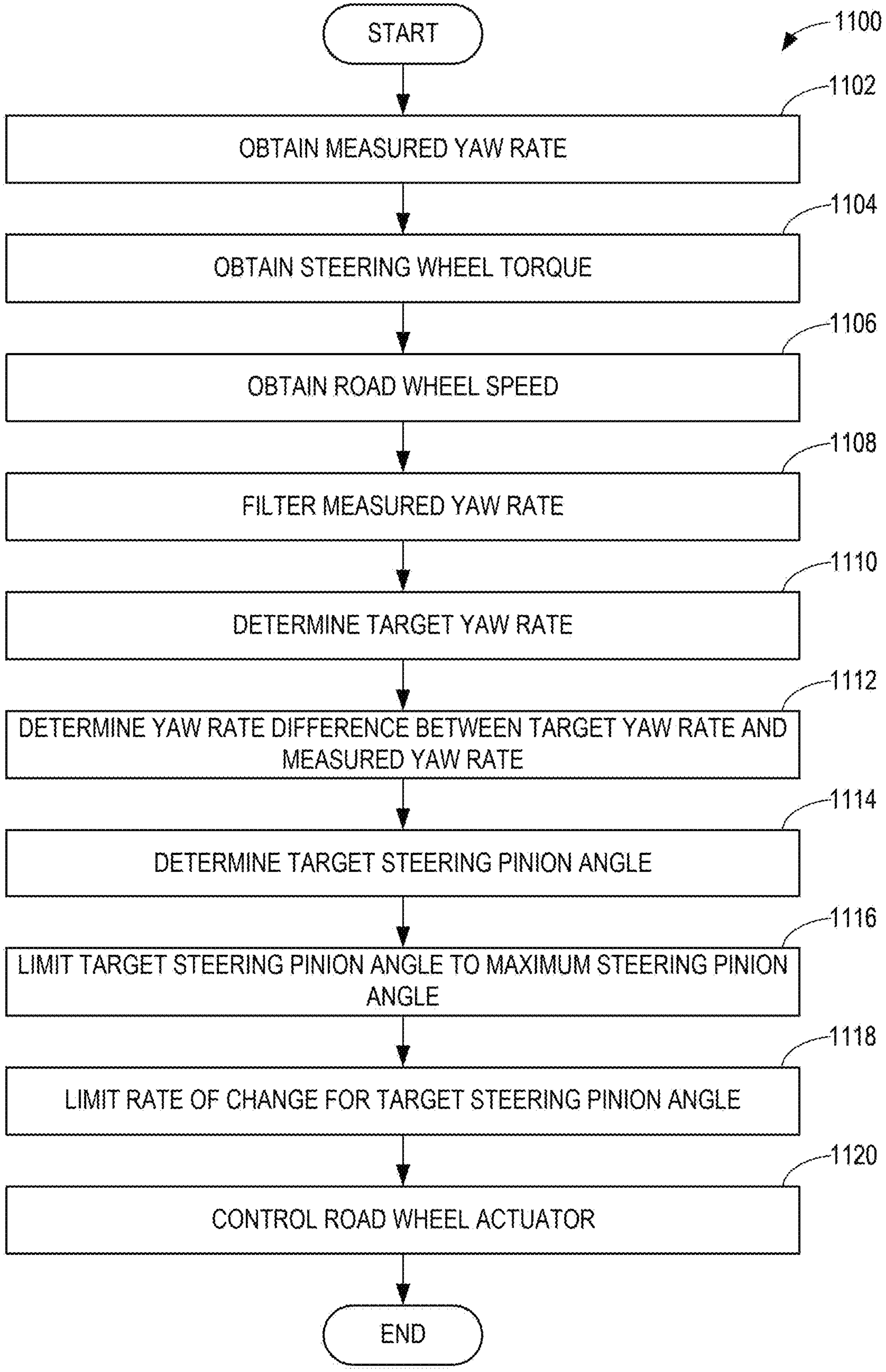
FIG. 11 is a flowchart representative of example machine-readable instructions and/or example operations that may be executed, instantiated, and/or performed by example programmable circuitry to implement the steer command controller of FIG. 5 to generate steer commands based on vehicle yaw rate.

FIG. 11 is a flowchart representative of example machine-readable instructions and/or example operations 1100 that may be executed, instantiated, and/or performed by programmable circuitry to implement the steer command controller 107 of FIG. 5 to generate steer commands based on vehicle yaw rate. In some examples, the instructions and/or operations 1100 may be implemented based on the yaw-rate-based steering control diagram 700 of FIG. 7. The instructions and/or operations 1100 begin at block 1102 at which the interface circuitry 502 obtains a measured yaw rate value of the vehicle 100. In some examples, the interface circuitry 502 obtains the yaw rate signal 718 at block 1102 from the yaw rate sensor 112 and samples/processes the yaw rate signal 718 to obtain the measured yaw rate value from the yaw rate signal 718.

At block 1104, the interface circuitry 502 obtains the driver input steering wheel torque value 714. For example, the driver input steering wheel torque value 714 corresponds to torque produced by a driver via the spring-to-center steering wheel 202. At block 1106, the interface circuitry 502 obtains the road wheel speed value 716. At block 1108, the low-pass filter circuitry 506 filters the measured yaw rate. For example, if the interface circuitry 502 receives the yaw rate signal 718 from the yaw rate sensor 112 at block 1102, the low-pass filter circuitry 506 processes the yaw rate signal 718 to remove high-frequency noise and generate the measured yaw rate value as described above in connection with the low-pass filtration process 704 of FIG. 7. In other examples in which the interface circuitry 502 receives a measured yaw rate value from the yaw rate sensor 112 at block 1102, the low-pass filtration of block 1108 can be skipped or omitted.

At block 1110, the yaw-rate-based steering controller circuitry 524 determines a target yaw rate value. For example, the yaw-rate-based steering controller circuitry 524 can determine the target yaw rate value based on the driver input steering wheel torque value 714 and the road wheel speed value 716 as described above in connection with the target yaw rate selection process 702 of FIG. 7. At block 1112, the arithmetic logic circuitry 508 determines a yaw rate difference between the target yaw rate value and the measured yaw rate value. For example, the arithmetic logic circuitry 508 determines the yaw rate difference as described above in connection with the difference calculation process 706 of FIG. 7.

At block 1114, the closed-loop controller circuitry 510 determines a target steering pinion angle value. For example, the closed-loop controller circuitry 510 determines the target steering pinion angle value based on the yaw rate difference as described above in connection with steering pinion angle calculation process 708 of FIG. 7. At block 1116, the saturation limiter circuitry 512 limits the target steering pinion angle value to a maximum steering pinion angle. For example, the saturation limiter circuitry 512 limits the target steering pinion angle value as described above in connection with the saturation limitation process 710 of FIG. 7. At block 1118, the rate limiter circuitry 514 limits a rate of change associated with the target steering pinion angle value. For example, the rate limiter circuitry 514 limits the rate of change associated with the target steering pinion angle value as described above in connection with the rate limitation process 712 of FIG. 7.

At block 1120, the yaw-rate-based steering controller circuitry 524 controls the road wheel actuator 102 to turn the road wheels 108*a,b* based on the target steering pinion angle value. For example, the yaw-rate-based steering controller circuitry 524 can provide the target steering pinion value in the yaw-rate-based steer command 720 and cause the interface circuitry 502 to send the yaw-rate-based steer command 720 to the road wheel actuator 102. Accordingly, the road wheel actuator 102 can control the rack and pinion system 206 to turn the road wheels 108*a,b* based on the target steering pinion angle value in the yaw-rate-based steer command 720. The instructions and/or operations 1100 end.

The instructions and/or operations 1100 can be repeated multiple times (e.g., a loop execution) throughout a driving session. For example, the driver input steering wheel torque 714, the road wheel speed 716, and the yaw rate signal 718 of the vehicle 100 can be continuously monitored and the instructions and/or operations 1100 can be repeated continuously to generate yaw-rate-based steer commands 720 based on the most recently obtained driver input steering wheel torque 714, road wheel speed 716, and yaw rate signal 718. In some examples, the loop execution of the instructions and/or operations 1100 ends when the vehicle 100 is placed into a park mode and/or the vehicle 100 is turned off.

Figure 12:
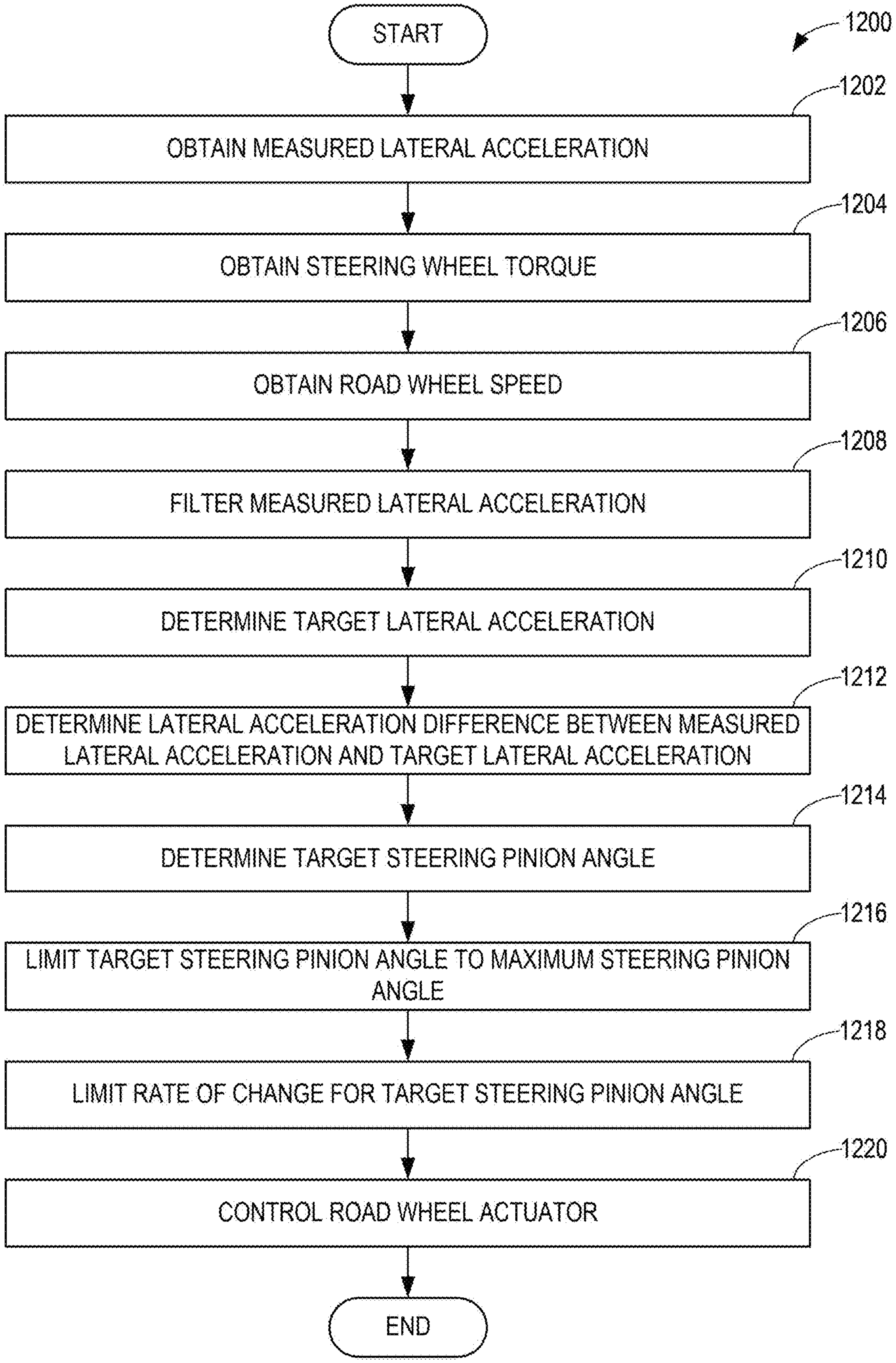
FIG. 12 is a flowchart representative of example machine-readable instructions and/or example operations that may be executed, instantiated, and/or performed by example programmable circuitry to implement the steer command controller of FIG. 5 to generate steer commands based on lateral acceleration.

FIG. 12 is a flowchart representative of example machine-readable instructions and/or example operations 1200 that may be executed, instantiated, and/or performed by programmable circuitry to implement the steer command controller 107 of FIG. 5 to generate steer commands based on lateral acceleration. In some examples, the instructions and/or operations 1200 may be implemented based on the lateral-acceleration-based steering control diagram 800 of FIG. 8. The instructions and/or operations 1200 begin at block 1202 at which the interface circuitry 502 obtains a measured lateral acceleration value of the vehicle 100. In some examples, the interface circuitry 502 obtains the lateral acceleration signal 818 at block 1202 from the lateral acceleration sensor 114 and samples/processes the lateral acceleration signal 818 to obtain the measured lateral acceleration value from the lateral acceleration signal 818.

At block 1204, the interface circuitry 502 obtains the driver input steering wheel torque value 814. For example, the driver input steering wheel torque value 814 corresponds to torque produced by a driver via the spring-to-center steering wheel 202. At block 1206, the interface circuitry 502 obtains the road wheel speed value 816. At block 1208, the low-pass filter circuitry 506 filters the measured lateral acceleration. For example, if the interface circuitry 502 receives the lateral acceleration signal 818 from the lateral acceleration sensor 114 at block 1202, the low-pass filter circuitry 506 processes the lateral acceleration signal 818 to remove high-frequency noise and generate the measured lateral acceleration value as described above in connection with the low-pass filtration process 804 of FIG. 8. In other examples in which the interface circuitry 502 receives a measured lateral acceleration value from the lateral acceleration sensor 114 at block 1202, the low-pass filtration of block 1208 can be skipped or omitted.

At block 1210, the lateral-acceleration-based steering controller circuitry 526 determines a target lateral acceleration value. For example, the lateral-acceleration-based steering controller circuitry 526 can determine the target lateral acceleration value based on the driver input steering wheel torque value 814 and the road wheel speed value 816 as described above in connection with the target lateral acceleration selection process 802 of FIG. 8. At block 1212, the arithmetic logic circuitry 508 determines a lateral acceleration difference between the measured lateral acceleration value and the target lateral acceleration value. For example, the arithmetic logic circuitry 508 determines the lateral acceleration difference as described above in connection with the difference calculation process 806 of FIG. 8.

At block 1214, the closed-loop controller circuitry 510 determines a target steering pinion angle value. For example, the closed-loop controller circuitry 510 determines the target steering pinion angle value based on the lateral acceleration difference as described above in connection with steering pinion angle calculation process 808 of FIG. 8. At block 1216, the saturation limiter circuitry 512 limits the target steering pinion angle value to a maximum steering pinion angle. For example, the saturation limiter circuitry 512 limits the target steering pinion angle value as described above in connection with the saturation limitation process 810 of FIG. 8. At block 1218, the rate limiter circuitry 514 limits a rate of change associated with the target steering pinion angle value. For example, the rate limiter circuitry 514 limits the rate of change associated with the target steering pinion angle value as described above in connection with the rate limitation process 812 of FIG. 8.

At block 1220, the lateral-acceleration-based steering controller circuitry 526 controls the road wheel actuator 102 to turn the road wheels 108*a,b* based on the target steering pinion angle value. For example, the lateral-acceleration-based steering controller circuitry 526 can provide the target steering pinion value in the lateral-acceleration-based steer command 820 and cause the interface circuitry 502 to send the lateral-acceleration-based steer command 820 to the road wheel actuator 102. Accordingly, the road wheel actuator 102 can control the rack and pinion system 206 to turn the road wheels 108*a,b* based on the target steering pinion angle value in the lateral-angle-based steer command 820. The instructions and/or operations 1200 end.

The instructions and/or operations 1200 can be repeated multiple times (e.g., a loop execution) throughout a driving session. For example, the driver input steering wheel torque 814, the road wheel speed 816, and the lateral acceleration signal 818 of the vehicle 100 can be continuously monitored and the instructions and/or operations 1200 can be repeated continuously to generate lateral-acceleration-based steer commands 820 based on the most recently obtained driver input steering wheel torque 814, road wheel speed 816, and lateral acceleration signal 818. In some examples, the loop execution of the instructions and/or operations 1200 ends when the vehicle 100 is placed into a park mode and/or the vehicle 100 is turned off.

Figure 13:
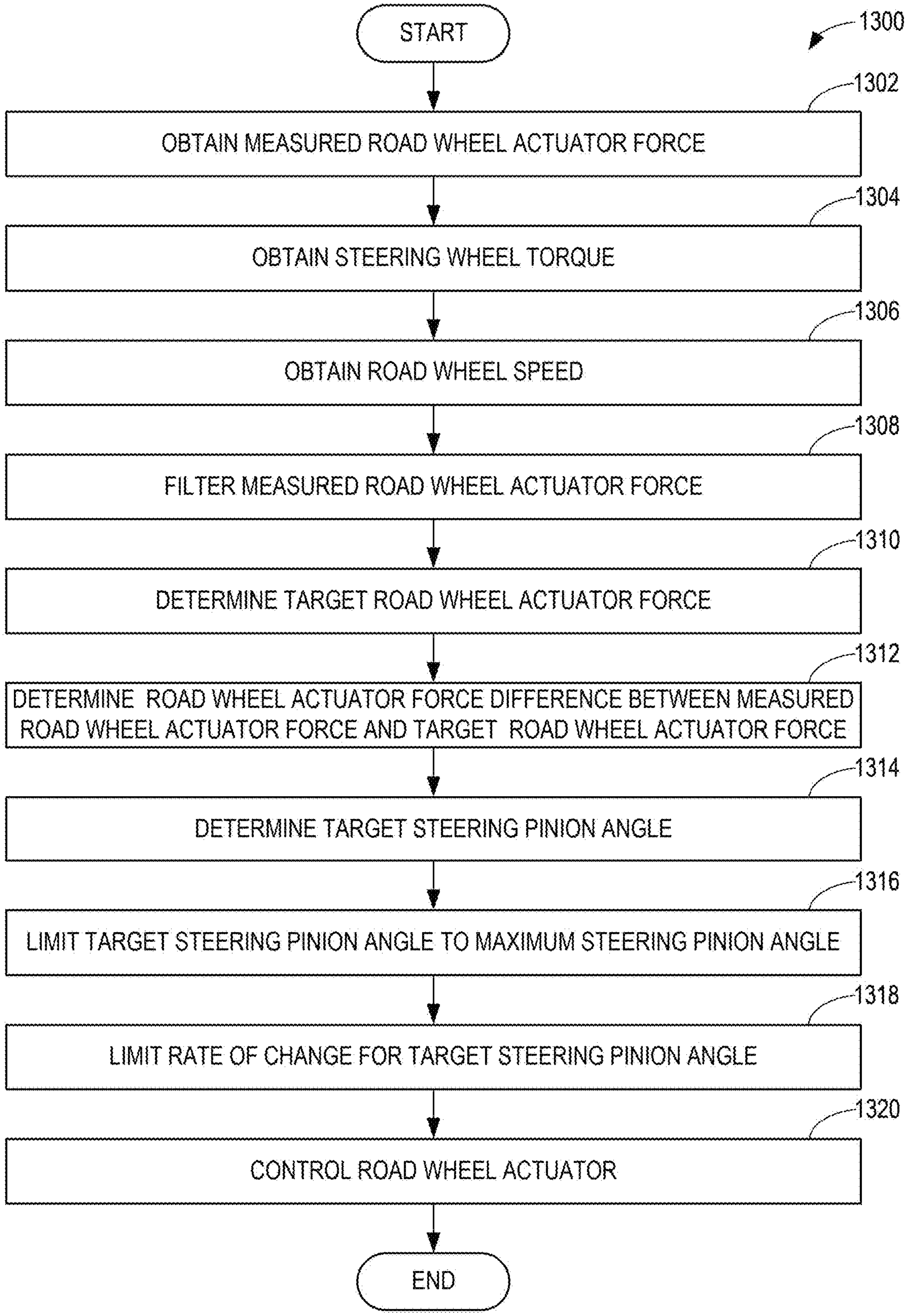
FIG. 13 is a flowchart representative of example machine-readable instructions and/or example operations that may be executed, instantiated, and/or performed by example programmable circuitry to implement the steer command controller of FIG. 5 to generate steer commands based on road wheel actuator force.

FIG. 13 is a flowchart representative of example machine-readable instructions and/or example operations 1300 that may be executed, instantiated, and/or performed by programmable circuitry to implement the steer command controller 107 of FIG. 5 to generate steer commands based on road wheel actuator force. In some examples, the instructions and/or operations 1300 may be implemented based on the RWA-force-based steering control diagram 900 of FIG. 9. The instructions and/or operations 1300 begin at block 1302 at which the interface circuitry 502 obtains a measured RWA force value of the vehicle 100. In some examples, the interface circuitry 502 obtains the RWA force signal 918 at block 1302 from the RWA force sensor 116 and samples/processes the RWA force signal 918 to obtain the measured RWA force value from the RWA force signal 918.

At block 1304, the interface circuitry 502 obtains the driver input steering wheel torque value 914. For example, the driver input steering wheel torque value 914 corresponds to torque produced by a driver via the spring-to-center steering wheel 202. At block 1306, the interface circuitry 502 obtains the road wheel speed value 916. At block 1308, the low-pass filter circuitry 506 filters the measured RWA force. For example, if the interface circuitry 502 receives the RWA force signal 918 from the RWA force sensor 116 at block 1302, the low-pass filter circuitry 506 processes the RWA force signal 918 to remove high-frequency noise and generate the measured RWA force value as described above in connection with the low-pass filtration process 904 of FIG. 9. In other examples in which the interface circuitry 502 receives a measured RWA force value from the RWA force sensor 116 at block 1302, the low-pass filtration of block 1308 can be skipped or omitted.

At block 1310, the RWA-force-based steering controller circuitry 528 determines a target RWA force value. For example, the RWA-force-based steering controller circuitry 528 can determine the target RWA force value based on the driver input steering wheel torque value 914 and the road wheel speed value 916 as described above in connection with the target RWA force selection process 902 of FIG. 9. At block 1312, the arithmetic logic circuitry 508 determines a RWA force difference between the measured RWA force value and the target RWA force value. For example, the arithmetic logic circuitry 508 determines the RWA force difference as described above in connection with the difference calculation process 906 of FIG. 9.

At block 1314, the closed-loop controller circuitry 510 determines a target steering pinion angle value. For example, the closed-loop controller circuitry 510 determines the target steering pinion angle value based on the RWA force difference as described above in connection with steering pinion angle calculation process 908 of FIG. 9. At block 1316, the saturation limiter circuitry 512 limits the target steering pinion angle value to a maximum steering pinion angle. For example, the saturation limiter circuitry 512 limits the target steering pinion angle value as described above in connection with the saturation limitation process 910 of FIG. 9. At block 1318, the rate limiter circuitry 514 limits a rate of change associated with the target steering pinion angle value. For example, the rate limiter circuitry 514 limits the rate of change associated with the target steering pinion angle value as described above in connection with the rate limitation process 912 of FIG. 9.

At block 1320, the RWA-force-based steering controller circuitry 528 controls the road wheel actuator 102 to turn the road wheels 108*a,b* based on the target steering pinion angle value. For example, the RWA-force-based steering controller circuitry 528 can provide the target steering pinion value in the RWA-force-based steer command 920 and cause the interface circuitry 502 to send the RWA-force-based steer command 920 to the road wheel actuator 102. Accordingly, the road wheel actuator 102 can control the rack and pinion system 206 to turn the road wheels 108*a,b* based on the target steering pinion angle value in the RWA-force-based steer command 920. The instructions and/or operations 1300 end.

The instructions and/or operations 1300 can be repeated multiple times (e.g., a loop execution) throughout a driving session. For example, the driver input steering wheel torque 914, the road wheel speed 916, and the RWA force signal 918 of the vehicle 100 can be continuously monitored and the instructions and/or operations 1300 can be repeated continuously to generate RWA-force-based steer commands 920 based on the most recently obtained driver input steering wheel torque 914, road wheel speed 916, and RWA force signal 918. In some examples, the loop execution of the instructions and/or operations 1300 ends when the vehicle 100 is placed into a park mode and/or the vehicle 100 is turned off.

Figure 14:
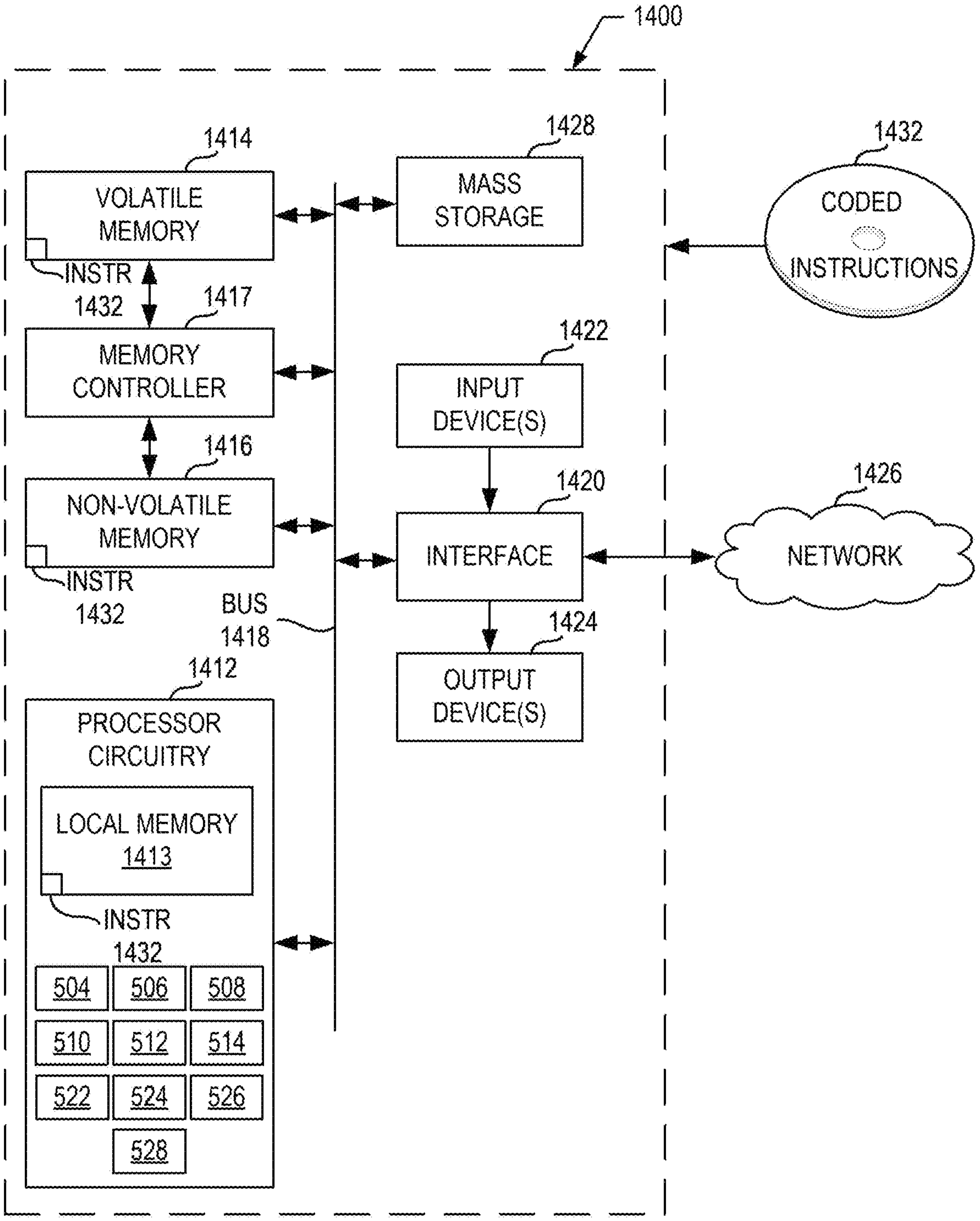
FIG. 14 is a block diagram of an example processing platform including programmable circuitry structured to execute, instantiate, and/or perform the example machine-readable instructions and/or perform the example operations of FIGS. 10-13 to implement the steer command controller of FIG. 5.

FIG. 14 is a block diagram of an example programmable circuitry platform 1400 structured to execute and/or instantiate the example machine-readable instructions and/or the example operations of FIGS. 10-13 to implement the steer command controller 107 of FIG. 5. The programmable circuitry platform 1400 can be, for example, an ECU, a self-learning machine (e.g., a neural network), or any other type of computing and/or electronic device.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs, microprocessors, CPUs, GPUs, DSPs, XPUs, and/or microcontrollers from any desired family or manufacturer. The programmable circuitry 1412 may be implemented by one or more semiconductor based (e.g., silicon based) devices. In this example, the programmable circuitry 1412 implements the target parameter controller circuitry 504, the low-pass filter circuitry 506, the arithmetic logic circuitry 508, the closed-loop controller circuitry 510, the saturation limiter circuitry 512, the rate limiter circuitry 514, the steering-torque-based steering controller circuitry 522, the yaw-rate-based steering controller circuitry 524, the lateral-acceleration-based steering controller circuitry 526, and the RWA-force-based steering controller circuitry 528.

The programmable circuitry 1412 of the illustrated example includes a local memory 1413 (e.g., a cache, registers, etc.). The programmable circuitry 1412 of the illustrated example is in communication with main memory 1414, 1416, which includes a volatile memory 1414 and a non-volatile memory 1416, by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417. In some examples, the memory controller 1417 may be implemented by one or more integrated circuits, logic circuits, microcontrollers from any desired family or manufacturer, or any other type of circuitry to manage the flow of data going to and from the main memory 1414, 1416.

The programmable circuitry platform 1400 of the illustrated example also includes interface circuitry 1420. The interface circuitry 1420 may be implemented by hardware in accordance with any type of interface standard, such as a CAN bus interface, a Local Interconnect Network (LIN) bus interface, a Media Oriented Systems Transport (MOST) bus interface, an Automotive Ethernet bus interface, a universal serial bus (USB) interface, etc. In the example of FIG. 14, the interface circuitry 1420 implements the interface circuitry 502 of FIG. 5. In the illustrated example, a plurality of input devices 1422 are connected to the interface circuitry 1420. The input devices 1422 permit measuring parameters of the vehicle 100. In examples disclosed herein, the input devices 1422 include the steering torque sensor 106, the speed sensor 110, the yaw rate sensor 112, the lateral acceleration sensor 114, the RWA force sensor 116, and the ABS controller 118 of FIG. 1.

One or more output devices 1424 are also connected to the interface circuitry 1420 of the illustrated example. The output device(s) 1424 can be implemented, for example, by light emitting diodes (LEDs), organic light emitting diodes (OLEDs), a liquid crystal display (LCD), and/or speakers. In some examples, the interface circuitry 1420 includes a graphics driver card, a graphics driver chip, and/or graphics processor circuitry such as a GPU.

The interface circuitry 1420 of the illustrated example also includes a communication device such as a transmitter, a receiver, a transceiver, a modem, a wireless access point, and/or a network interface to facilitate exchange of data with internal and/or external machines (e.g., computing devices of any kind) by a network 1426. The communication can be by, for example, a satellite system, a beyond-line-of-sight wireless system, a line-of-sight wireless system, a cellular telephone system, etc.

The programmable circuitry platform 1400 of the illustrated example also includes one or more mass storage discs or devices 1428 to store firmware, software, and/or data. Examples of such mass storage discs or devices 1428 include magnetic storage devices, optical storage devices, and/or solid-state storage discs or devices such as flash memory devices and/or SSDs.

The machine-readable instructions 1432, which may be implemented by the machine-readable instructions of FIGS. 10-13, may be stored in the mass storage device 1428, in the volatile memory 1414, in the non-volatile memory 1416, and/or on at least one non-transitory computer-readable storage medium which may be removable.

Figure 15:
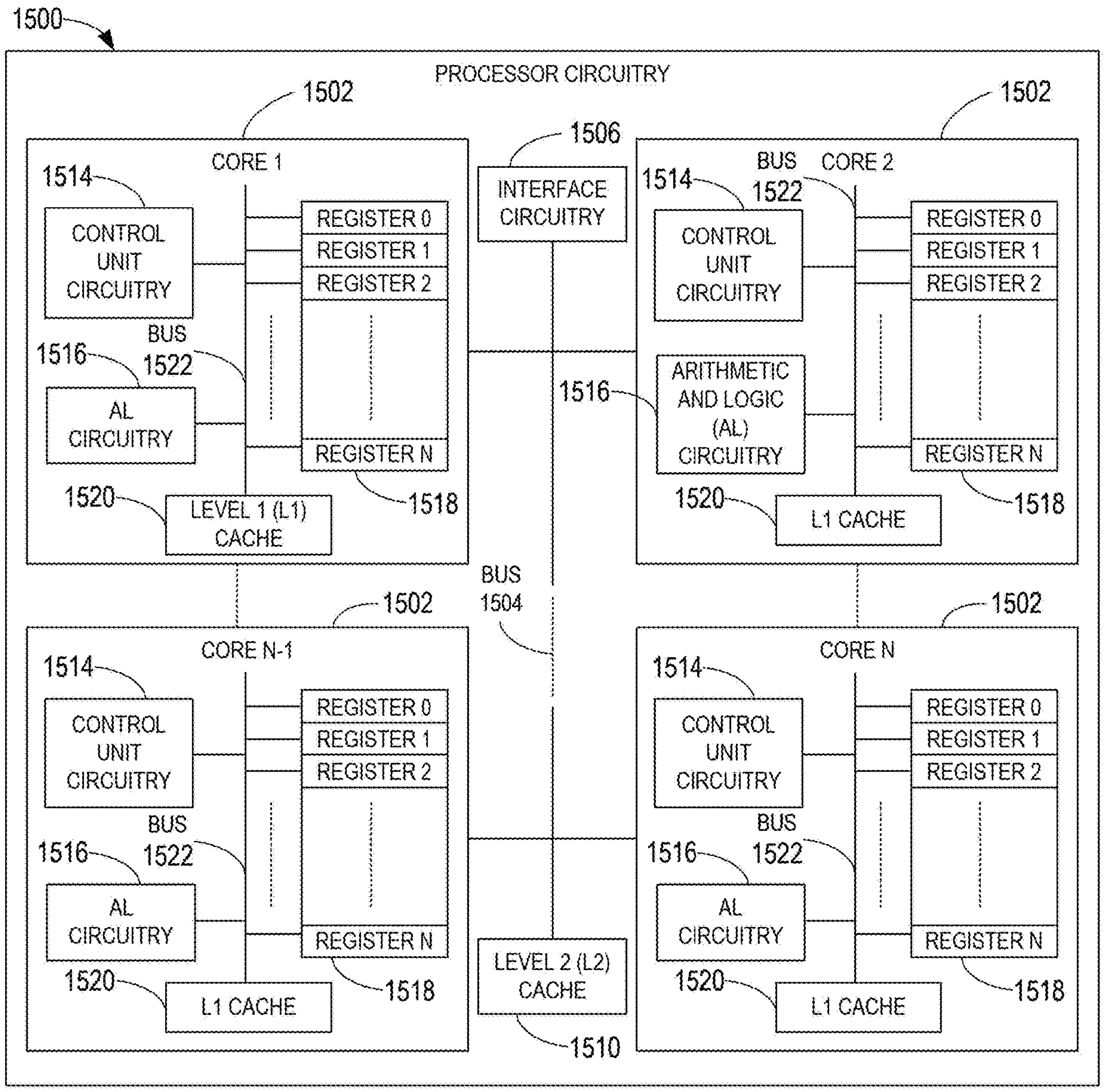
FIG. 15 is a block diagram of an example implementation of the programmable circuitry of FIG. 14.

FIG. 15 is a block diagram of an example implementation of the programmable circuitry 1412 of FIG. 14. In this example, the programmable circuitry 1412 of FIG. 14 is implemented by a microprocessor 1500. For example, the microprocessor 1500 may be a general-purpose microprocessor (e.g., general-purpose microprocessor circuitry). The microprocessor 1500 and/or components thereof may include additional and/or alternate structures to those shown and described below. The microprocessor 1500 is a semiconductor device fabricated to include transistors interconnected to implement the structures described below in one or more integrated circuits (ICs) contained in one or more packages.

The microprocessor 1500 executes machine-readable instructions of the flowcharts of FIGS. 10-13 to instantiate the circuitry of FIG. 5 as logic circuits to perform operations corresponding to those machine-readable instructions. In some such examples, the circuitry of FIG. 5 is instantiated by the hardware circuits of the microprocessor 1500 in combination with the machine-readable instructions. For example, the microprocessor 1500 may be implemented by multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine-readable instructions. For example, machine code corresponding to a firmware program, an embedded software program, or a software program represented by the flowcharts of FIGS. 10-13 may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine-readable instructions and/or operations represented by the flowcharts of FIGS. 10-13.

The cores 1502 may communicate by a first example bus 1504. For example, the first bus 1504 may be implemented by any suitable bus technology (e.g., an Inter-Integrated Circuit (I2C) bus, a Serial Peripheral Interface (SPI) bus, a Peripheral Component Interconnect (PCI) bus, a Peripheral Component Interconnect Express (PCIe) bus, a CAN bus, a LIN bus interface, a MOST bus interface, an Automotive Ethernet bus interface, etc.). Data, instructions, and/or signals may be communicated (e.g., accessed, obtained, output, provided, etc.) between the cores 1502 and one or more external devices by example interface circuitry 1506. Although the cores 1502 of this example include example local cache 1520 (e.g., Level 1 (L1) cache that may be split into an L1 data cache and an L1 instruction cache), the microprocessor 1500 also includes example shared cache 1510. The shared cache 1510 is shared by the cores (e.g., Level 2 (L2 cache)) to access data and/or instructions across the cores.

Each core 1502 includes control unit circuitry 1514, arithmetic and logic (AL) circuitry (sometimes referred to as an arithmetic logic unit (ALU)) 1516, a plurality of registers 1518 (e.g., hardware registers), the local cache 1520, and a second example bus 1522. The control unit circuitry 1514 controls (e.g., coordinates) data movement within the corresponding core 1502. The AL circuitry 1516 performs one or more mathematic and/or logic operations on the data within the corresponding core 1502.

The registers 1518 store data and/or instructions such as results of operations performed by the AL circuitry 1516. The second bus 1522 may be implemented using any suitable bus technology (e.g., an I2C bus, a SPI bus, a PCI bus, or a PCIe bus, etc.).

Figure 16:
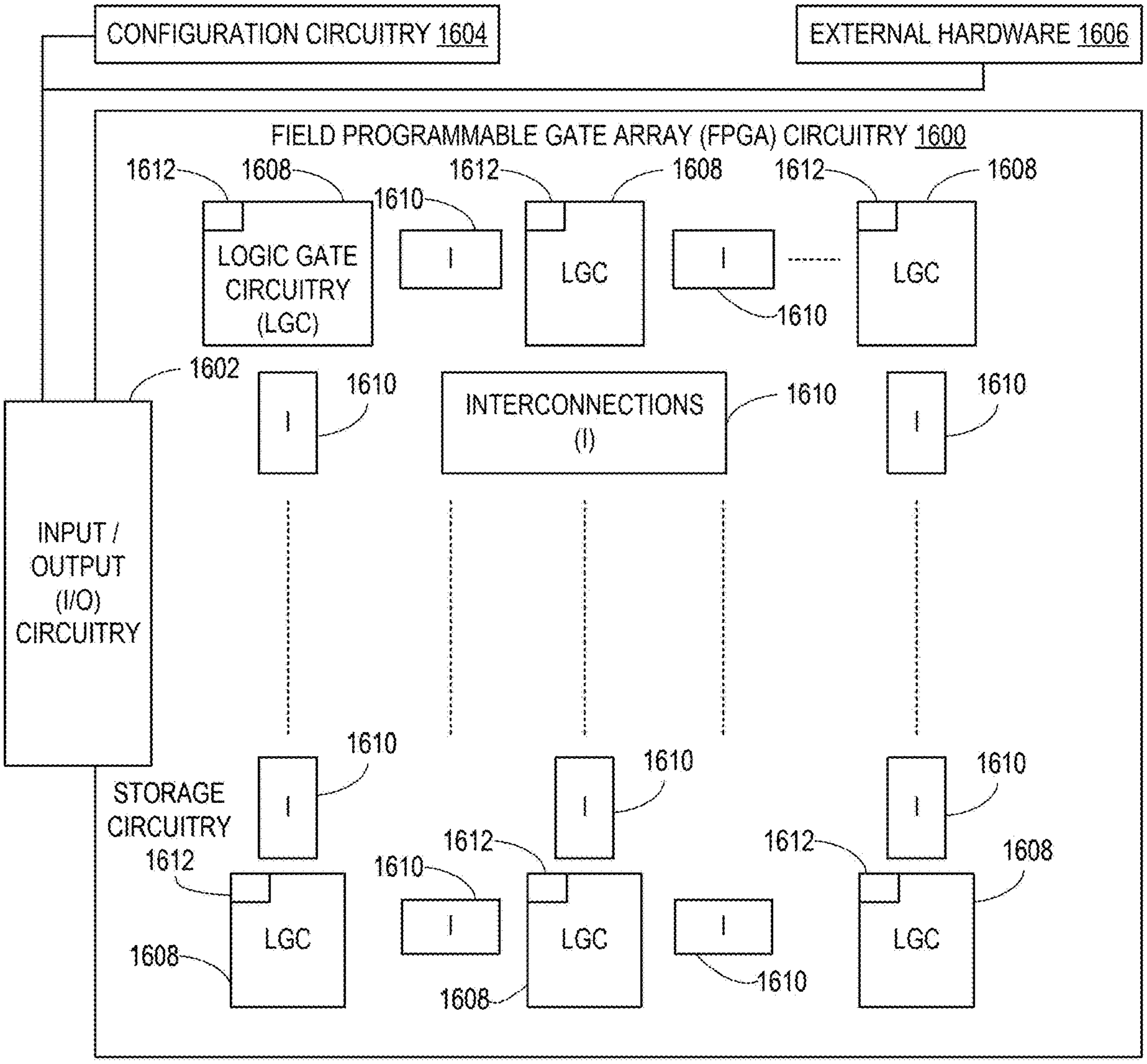
FIG. 16 is a block diagram of another example implementation of the programmable circuitry of FIG. 14.

FIG. 16 is a block diagram of another example implementation of the programmable circuitry 1412 of FIG. 14. In this example, the programmable circuitry 1412 is implemented by FPGA circuitry 1600. Programmable logic circuitry of the FPGA circuitry 1600 may be programmed to create dedicated logic circuits that perform operations and/or functions represented in the flowcharts of FIGS. 10-13. For example, the FPGA circuitry 1600 includes interconnections and logic circuitry (e.g., logic gates, switches, etc.) that may be configured, structured, programmed, and/or interconnected in different ways to instantiate some or all of the operations/functions corresponding to the machine-readable instructions represented by the flowcharts of FIGS. 10-13. After an FPGA programming process, the FPGA circuitry 1600 instantiates the operations and/or functions corresponding to the machine-readable instructions in hardware. In some examples, the FPGA circuitry 1600 can execute the operations/functions faster than they could be performed by a general-purpose microprocessor.

The FPGA circuitry 1600 of FIG. 16, includes example input/output (I/O) circuitry 1602 to obtain data from and/or output data to example configuration circuitry 1604 and/or external hardware 1606 (e.g., microprocessor circuitry, controller circuitry, memory circuitry, storage circuitry, a computer, etc.). For example, the configuration circuitry 1604 may be implemented by interface circuitry that obtains a binary file to program or configure the FPGA circuitry 1600.

The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations/functions that may correspond to machine-readable instructions of FIGS. 10-13 and/or other desired operations.

The storage circuitry 1612 is structured to store result(s) of operations performed by corresponding logic gates. The storage circuitry 1612 may be implemented by registers or the like.

Although not shown, the example FPGA circuitry 1600 of FIG. 16 also includes example dedicated operations circuitry to implement functions without programming those functions in the logic gate circuitry 1608. The FPGA circuitry 1600 may also include general purpose programmable circuitry such as a CPU, a DSP, etc.

Although FIGS. 15 and 16 illustrate two example implementations of the programmable circuitry 1412 of FIG. 14, many other approaches are contemplated. For example, a hybrid circuitry example may include one or more cores 1502 of FIG. 15 that execute(s) a first portion of the machine-readable instructions represented by the flowcharts of FIGS. 10-13 to perform first operation(s)/function(s), and/or include the FPGA circuitry 1600 of FIG. 16 configured and/or structured to perform second operation(s)/function(s) corresponding to a second portion of the machine-readable instructions represented by the flowcharts of FIG. 10-13, and/or include an ASIC configured and/or structured to perform third operation(s)/function(s) corresponding to a third portion of the machine-readable instructions represented by the flowcharts of FIGS. 10-13.

As used herein, integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In some examples, the programmable circuitry 1412 of FIG. 14 may be in one or more packages. For example, the microprocessor 1500 of FIG. 15 and/or the FPGA circuitry 1600 of FIG. 16 may be in one or more packages.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" modifies its subjects/values to recognize the potential presence of variations that occur in real world applications. For example, "approximately" may modify dimensions that may not be exact due to manufacturing tolerances and/or other real world imperfections as will be understood by persons of ordinary skill in the art. For example, "approximately" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

Example methods, apparatus, systems, and articles of manufacture to implement SBW systems with spring-to-center steering wheel control of a vehicle are disclosed herein. Further examples and combinations thereof include the following:

Example 1 includes a steer-by-wire system comprising interface circuitry to obtain a steering wheel torque value corresponding to torque produced via a spring-to-center steering wheel, machine-readable instructions, and at least one processor circuit to be programmed by the machine-readable instructions to determine a steering pinion angle value based on the steering wheel torque value, and control a road wheel actuator to turn a road wheel based on the steering pinion angle value.

Example 2 includes the steer-by-wire system of example 1, wherein the interface circuitry is to obtain the steering wheel torque value based on a shaft torque sensor, the shaft torque sensor to sense the torque transferred from the spring-to-center steering wheel to a spring-to-center steering shaft.

Example 3 includes the steer-by-wire system of example 1 and/or example 2, wherein the interface circuitry is to obtain the steering wheel torque value based on a load cell, the load cell to sense the torque from the spring-to-center steering wheel.

Example 4 includes the steer-by-wire system of any one or more of examples 1-3, wherein the interface circuitry is to receive the steering wheel torque value based on a twist angle of a spring-to-center steering shaft measured by at least one of a geared angle sensor or an encoder, the twist angle of the spring-to-center steering shaft based on the torque produced via the spring-to-center steering wheel.

Example 5 includes the steer-by-wire system of any one or more of examples 1-4, wherein the interface circuitry is to receive a speed value of a road wheel from an anti-lock braking system controller, one or more of the at least one processor circuit to determine the steering pinion angle value based on the steering wheel torque value and the speed value.

Example 6 includes the steer-by-wire system of any one or more of examples 1-5, wherein one or more of the at least one processor circuit is to limit the steering pinion angle value to a maximum steering pinion angle capability of the road wheel actuator, the maximum steering pinion angle capability based on at least one of a detected understeer or a speed value of the road wheel.

Example 7 includes the steer-by-wire system of any one or more of examples 1-7, wherein one or more of the at least one processor circuit is to limit a rate of change associated with the steering pinion angle value based on a threshold slew rate.

Example 8 includes a steer-by-wire system comprising interface circuitry to obtain a measured yaw rate value of a vehicle, and obtain a steering wheel torque value corresponding to torque produced via a spring-to-center steering wheel, machine-readable instructions, and at least one processor circuit to be programmed by the machine-readable instructions to determine a target yaw rate value based on the steering wheel torque value, determine a yaw rate difference between the measured yaw rate value and the target yaw rate value, determine a steering pinion angle value based on the yaw rate difference, and control a road wheel actuator to turn a road wheel based on the steering pinion angle value.

Example 9 includes the steer-by-wire system of example 8, wherein the interface circuitry is to obtain the steering wheel torque value based on at least one of a shaft torque sensor or a load cell, the at least one of the shaft torque sensor or the load cell to sense the torque transferred from the spring-to-center steering wheel to a spring-to-center steering shaft.

Example 10 includes the steer-by-wire system of example 8 and/or example 9, wherein the interface circuitry is to obtain the measured yaw rate value based on measurements from an anti-lock braking system controller.

Example 11 includes the steer-by-wire system of any one or more of examples 8-10, wherein one or more of the at least one processor circuit is to determine the target yaw rate value based on the steering wheel torque value and a road wheel speed value.

Example 12 includes the steer-by-wire system of any one or more of examples 8-11, wherein one or more of the at least one processor circuit is to limit the steering pinion angle value to a maximum steering pinion angle capability of the road wheel actuator, the maximum steering pinion angle capability based on a road wheel speed value.

Example 13 includes the steer-by-wire system of any one or more of examples 8-12, wherein one or more of the at least one processor circuit is to limit a rate of change associated with the steering pinion angle value based on a threshold slew rate.

Example 14 includes at least one non-transitory machine-readable medium comprising machine-readable instructions to cause at least one processor circuit to at least access a steering wheel torque value corresponding to torque produced via a spring-to-center steering wheel, determine a steering pinion angle value based on the steering wheel torque value, and control a road wheel actuator to turn a road wheel based on the steering pinion angle value.

Example 15 includes the at least one non-transitory machine-readable medium of example 14, wherein the machine-readable instructions are to cause one or more of the at least one processor circuit to limit the steering pinion angle value to a maximum steering pinion angle capability of the road wheel actuator, the maximum steering pinion angle capability based on at least one of a detected understeer or a road wheel speed value.

Example 16 includes the at least one non-transitory machine-readable medium of example 14 and/or example 15, wherein the machine-readable instructions are to cause one or more of the at least one processor circuit to limit a rate of change associated with the steering pinion angle value based on a threshold slew rate.

Example 17 includes at least one non-transitory machine-readable medium comprising machine-readable instructions to cause at least one processor circuit to at least determine a target yaw rate value based on a steering wheel torque value, the steering wheel torque value corresponding to torque applied to a spring-to-center steering wheel, determine a yaw rate difference between a measured yaw rate value of a vehicle and the target yaw rate value, determine a steering pinion angle value based on the yaw rate difference, and control a road wheel actuator to turn a road wheel based on the steering pinion angle value.

Example 18 includes the at least one non-transitory machine-readable medium of example 17, wherein the machine-readable instructions are to cause one or more of the at least one processor circuit to determine the target yaw rate value based on the steering wheel torque value and a road wheel speed value.

Example 19 includes the at least one non-transitory machine-readable medium of example 17 and/or example 18, wherein the machine-readable instructions are to cause one or more of the at least one processor circuit to limit the steering pinion angle value to a maximum steering pinion angle capability of the road wheel actuator, the maximum steering pinion angle capability based on a road wheel speed value.

Example 20 includes the at least one non-transitory machine-readable medium of any one or more of examples 17-19, wherein the machine-readable instructions are to cause one or more of the at least one processor circuit to determine the steering pinion angle value to decrease the yaw rate difference.

Example 21 includes a steer-by-wire system comprising interface circuitry to obtain a measured lateral acceleration value of a vehicle, and obtain a steering wheel torque value corresponding to torque produced via a spring-to-center steering wheel, machine-readable instructions, and at least one processor circuit to be programmed by the machine-readable instructions to determine a target lateral acceleration value based on the steering wheel torque value, determine a lateral acceleration difference between the measured lateral acceleration value and the target lateral acceleration value, determine a steering pinion angle value based on the lateral acceleration difference, and control a road wheel actuator to turn a road wheel based on the steering pinion angle value.

Example 22 includes the steer-by-wire system of example 21, wherein the interface circuitry is to obtain the steering wheel torque value based on at least one of a shaft torque sensor or a load cell, the at least one of the shaft torque sensor or the load cell to sense the torque transferred from the spring-to-center steering wheel to a spring-to-center steering shaft.

Example 23 includes the steer-by-wire system of example 21 and/or example 22, wherein the interface circuitry is to obtain the measured lateral acceleration value based on measurements from an anti-lock braking system controller.

Example 24 includes the steer-by-wire system of any one or more of examples 21-23, wherein one or more of the at least one processor circuit is to determine the target lateral acceleration value based on the steering wheel torque value and a road wheel speed value.

Example 25 includes the steer-by-wire system of any one or more of examples 21-24, wherein one or more of the at least one processor circuit is to limit the steering pinion angle value to a maximum steering pinion angle capability of the road wheel actuator.

Example 26 includes the steer-by-wire system of any one or more of examples 21-25, wherein one or more of the at least one processor circuit is to limit a rate of change associated with the steering pinion angle value based on a threshold slew rate.

Example 27 includes a steer-by-wire system comprising interface circuitry to obtain a measured road wheel actuator force value, and obtain a steering wheel torque value corresponding to torque produced via a spring-to-center steering wheel, machine-readable instructions, and at least one processor circuit to be programmed by the machine-readable instructions to determine a target road wheel actuator force value based on the steering wheel torque value, determine a road wheel actuator force difference between the measured road wheel actuator force value and the target road wheel actuator force value, determine a steering pinion angle value based on the road wheel actuator force difference, and control a road wheel actuator to turn a road wheel based on the steering pinion angle value.

Example 28 includes the steer-by-wire system of example 27, wherein the interface circuitry is to obtain the steering wheel torque value based on at least one of a shaft torque sensor or a load cell, the at least one of the shaft torque sensor or the load cell to sense the torque transferred from the spring-to-center steering wheel to a spring-to-center steering shaft.

Example 29 includes the steer-by-wire system of example 27 and/or example 28, wherein the measured road wheel actuator force value corresponds to forces exerted on a rack and pinion system.

Example 30 includes the steer-by-wire system of any one or more of examples 27-29, wherein one or more of the at least one processor circuit is to determine the target road wheel actuator force value based on the steering wheel torque value and a road wheel speed value.

Example 31 includes the steer-by-wire system of any one or more of examples 27-30, wherein one or more of the at least one processor circuit is to limit the steering pinion angle value to a maximum steering pinion angle capability of the road wheel actuator.

Example 32 includes the steer-by-wire system of any one or more of examples 27-31, wherein one or more of the at least one processor circuit is to limit a rate of change associated with the steering pinion angle value based on a threshold slew rate.

Example 33 includes at least one non-transitory machine-readable medium comprising machine-readable instructions to cause at least one processor circuit to at least determine a target lateral acceleration value based on a steering wheel torque value, the steering wheel torque value corresponding to torque applied to a spring-to-center steering wheel, determine a lateral acceleration difference between a measured lateral acceleration value of a vehicle and the target lateral acceleration value, determine a steering pinion angle value based on the lateral acceleration difference, and control a road wheel actuator to turn a road wheel based on the steering pinion angle value.

Example 34 includes the at least one non-transitory machine-readable medium of example 33, wherein the machine-readable instructions are to cause one or more of the at least one processor circuit to determine the target lateral acceleration value based on the steering wheel torque value and a road wheel speed value.

Example 35 includes the at least one non-transitory machine-readable medium of example 33 and/or example 34, wherein the machine-readable instructions are to cause one or more of the at least one processor circuit to determine the steering pinion angle value to decrease the lateral acceleration difference.

Example 36 includes the at least one non-transitory machine-readable medium of any one or more of examples 33-35, wherein the machine-readable instructions are to cause one or more of the at least one processor circuit to determine the steering pinion angle value based on at least one of a proportional-integral-derivative control algorithm, a H-infinity control algorithm, a linear-quadratic-regulator control algorithm, or a model predictive control algorithm.

Example 37 includes at least one non-transitory machine-readable medium comprising machine-readable instructions to cause at least one processor circuit to at least determine a target road wheel actuator force value based on a steering wheel torque value, the steering wheel torque value corresponding to torque applied to a spring-to-center steering wheel, determine a road wheel actuator force difference between a measured road wheel actuator force value and the target road wheel actuator force value, determine a steering pinion angle value based on the road wheel actuator force difference, and control a road wheel actuator to turn a road wheel based on the steering pinion angle value.

Example 38 includes the at least one non-transitory machine-readable medium of example 37, wherein the machine-readable instructions are to cause one or more of the at least one processor circuit to determine the target road wheel actuator force value based on the steering wheel torque value and a road wheel speed value.

Example 39 includes the at least one non-transitory machine-readable medium of example 37 and/or example 38, wherein the machine-readable instructions are to cause one or more of the at least one processor circuit to determine the steering pinion angle value to decrease the road wheel actuator force difference.

Example 40 includes the at least one non-transitory machine-readable medium of any one or more of examples 37-39, wherein the machine-readable instructions are to cause one or more of the at least one processor circuit to determine the steering pinion angle value based on at least one of a proportional-integral-derivative control algorithm, a H-infinity control algorithm, a linear-quadratic-regulator control algorithm, or a model predictive control algorithm.

From the foregoing, it will be appreciated that example systems, apparatus, articles of manufacture, and methods have been disclosed that implement SBW systems with spring-to-center steering wheel control of a vehicle. Disclosed systems, apparatus, articles of manufacture, and methods increase the efficiency of using SBW controller circuitry in a vehicle by controlling steering of the vehicle based on a spring-to-center steering wheel. Such use of the spring-to-center steering wheel reduces or eliminates the need to synchronize a rotational position of the steering wheel to an angle of the road wheels before full control is handed over to a driver from a driver-assistance mode in which the steering wheel may be parked at center. Disclosed systems, apparatus, articles of manufacture, and methods are accordingly directed to one or more improvement(s) in the operation of a machine such as a SBW ECU or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A steer-by-wire system comprising:
- interface circuitry to obtain a steering wheel torque value corresponding to torque produced via a spring-to-center steering wheel;
- machine-readable instructions; and
- at least one processor circuit to be programmed by the machine-readable instructions to:
  - determine a steering pinion angle value based on the steering wheel torque value; and
  - control a road wheel actuator to turn a road wheel based on the steering pinion angle value.

2. The steer-by-wire system of claim 1, wherein the interface circuitry is to obtain the steering wheel torque value based on a shaft torque sensor, the shaft torque sensor to sense the torque transferred from the spring-to-center steering wheel to a spring-to-center steering shaft.

3. The steer-by-wire system of claim 1, wherein the interface circuitry is to obtain the steering wheel torque value based on a load cell, the load cell to sense the torque from the spring-to-center steering wheel.

4. The steer-by-wire system of claim 1, wherein the interface circuitry is to receive the steering wheel torque value based on a twist angle of a spring-to-center steering shaft measured by at least one of a geared angle sensor or an encoder, the twist angle of the spring-to-center steering shaft based on the torque produced via the spring-to-center steering wheel.

5. The steer-by-wire system of claim 1, wherein the interface circuitry is to receive a speed value of a road wheel from an anti-lock braking system controller, one or more of the at least one processor circuit to determine the steering pinion angle value based on the steering wheel torque value and the speed value.

6. The steer-by-wire system of claim 1, wherein one or more of the at least one processor circuit is to limit the steering pinion angle value to a maximum steering pinion angle capability of the road wheel actuator, the maximum steering pinion angle capability based on at least one of a detected understeer or a speed value of the road wheel.

7. The steer-by-wire system of claim 1, wherein one or more of the at least one processor circuit is to limit a rate of change associated with the steering pinion angle value based on a threshold slew rate.

8. A steer-by-wire system comprising:
- interface circuitry to:
  - obtain a measured yaw rate value of a vehicle; and
  - obtain a steering wheel torque value corresponding to torque produced via a spring-to-center steering wheel;
- machine-readable instructions; and
- at least one processor circuit to be programmed by the machine-readable instructions to:
  - determine a target yaw rate value based on the steering wheel torque value;
  - determine a yaw rate difference between the measured yaw rate value and the target yaw rate value;
  - determine a steering pinion angle value based on the yaw rate difference; and
  - control a road wheel actuator to turn a road wheel based on the steering pinion angle value.

9. The steer-by-wire system of claim 8, wherein the interface circuitry is to obtain the steering wheel torque value based on at least one of a shaft torque sensor or a load cell, the at least one of the shaft torque sensor or the load cell to sense the torque transferred from the spring-to-center steering wheel to a spring-to-center steering shaft.

10. The steer-by-wire system of claim 8, wherein the interface circuitry is to obtain the measured yaw rate value based on measurements from an anti-lock braking system controller.

11. The steer-by-wire system of claim 8, wherein one or more of the at least one processor circuit is to determine the target yaw rate value based on the steering wheel torque value and a road wheel speed value.

12. The steer-by-wire system of claim 8, wherein one or more of the at least one processor circuit is to limit the steering pinion angle value to a maximum steering pinion angle capability of the road wheel actuator, the maximum steering pinion angle capability based on a road wheel speed value.

13. The steer-by-wire system of claim 8, wherein one or more of the at least one processor circuit is to limit a rate of change associated with the steering pinion angle value based on a threshold slew rate.

14. At least one non-transitory machine-readable medium comprising machine-readable instructions to cause at least one processor circuit to at least:

access a steering wheel torque value corresponding to torque produced via a spring-to-center steering wheel;

determine a steering pinion angle value based on the steering wheel torque value; and control a road wheel actuator to turn a road wheel based on the steering pinion angle value.

15. The at least one non-transitory machine-readable medium of claim 14, wherein the machine-readable instructions are to cause one or more of the at least one processor circuit to limit the steering pinion angle value to a maximum steering pinion angle capability of the road wheel actuator, the maximum steering pinion angle capability based on at least one of a detected understeer or a road wheel speed value.

16. The at least one non-transitory machine-readable medium of claim 14, wherein the machine-readable instructions are to cause one or more of the at least one processor circuit to limit a rate of change associated with the steering pinion angle value based on a threshold slew rate.

* * * * *